US012786826B2

(12) United States Patent
Ding et al.

(10) Patent No.: US 12,786,826 B2
(45) Date of Patent: Nov. 3, 2026

(54) CELL RESELECTION METHOD AND TERMINAL DEVICE

(71) Applicant: Honor Device Co., Ltd., Shenzhen (CN)

(72) Inventors: Ming Ding, Shenzhen (CN); Zhulin Wang, Shenzhen (CN); Longchang Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 698 days.

(21) Appl. No.: 18/025,970

(22) PCT Filed: Oct. 29, 2021

(86) PCT No.: PCT/CN2021/127422
§ 371 (c)(1),
(2) Date: Mar. 13, 2023

(87) PCT Pub. No.: WO2022/179156
PCT Pub. Date: Sep. 1, 2022

(65) Prior Publication Data

US 2023/0362768 A1 Nov. 9, 2023

(30) Foreign Application Priority Data

Feb. 25, 2021 (CN) ......................... 202110210605.3

(51) Int. Cl.
*H04W 36/08* (2009.01)
*H04W 36/16* (2009.01)
*H04W 84/04* (2009.01)

(52) U.S. Cl.
CPC .......... *H04W 36/08* (2013.01); *H04W 36/16* (2013.01); *H04W 84/042* (2013.01)

(58) Field of Classification Search
CPC ... H04W 36/08; H04W 36/16; H04W 84/042; H04W 48/18; H04W 48/20; H04W 36/24; Y02D 30/70
See application file for complete search history.

(56) References Cited

U.S. PATENT DOCUMENTS 8,983,475 B2 3/2015 Gopalakrishnan
9,185,610 B2 * 11/2015 Gulati .................. H04W 48/18
(Continued)

FOREIGN PATENT DOCUMENTS

CN 102696253 A 9/2012
CN 103037426 A 4/2013
(Continued)

OTHER PUBLICATIONS

Apple Inc., "Considerations on UE Mobility in NR-U," 3GPP TSG-RAN WG2 Meeting #104, R2-1817470, Spokane, USA, 4 pages (Nov. 12-16, 2018).
(Continued)

*Primary Examiner* — Ayaz R Sheikh
(74) *Attorney, Agent, or Firm* — Leydig, Voit & Mayer, Ltd.

(57) ABSTRACT

A cell reselection method implemented by a terminal includes: camping on a first cell, where a first frequency of the first cell corresponds to a first PLMN; when the terminal device detects that a second cell satisfies a cell reselection condition and a second PLMN of the second cell and the first PLMN are not EPLMNs, skipping performing an action of reselection to the second cell, and adding the second cell to a barred list, where a second frequency of the second cell corresponds to a second PLMN; and when the terminal device detects that a third cell satisfies the cell reselection condition, and a third PLMN of the third cell and the first PLMN are EPLMNs, performing, an action of reselection to the third cell, where the third cell corresponds to the second
(Continued)

frequency, and the third PLMN includes the first PLMN and the second PLMN.

20 Claims, 15 Drawing Sheets

(56) References Cited

U.S. PATENT DOCUMENTS

| | | | | |
|---|---|---|---|---|
| 9,854,480 | B2 | 12/2017 | Shu et al. | |
| 11,246,145 | B2 * | 2/2022 | Ma | H04W 72/0446 |
| 11,595,869 | B2 * | 2/2023 | Youtz | H04W 36/0061 |
| 12,543,080 | B2 * | 2/2026 | Adjakple | H04W 36/0061 |
| 2015/0141012 | A1 | 5/2015 | Ramkumar et al. | |
| 2015/0195755 | A1 * | 7/2015 | Gulati | H04W 36/0061 455/436 |
| 2016/0088539 | A1 | 3/2016 | Zingler et al. | |
| 2020/0112897 | A1 | 4/2020 | Jung et al. | |
| 2020/0221372 | A1 | 7/2020 | Shih et al. | |
| 2020/0314720 | A1 * | 10/2020 | Tang | H04W 36/00 |
| 2021/0168679 | A1 | 6/2021 | Liang et al. | |
| 2021/0345210 | A1 * | 11/2021 | Chen | H04W 36/008357 |

FOREIGN PATENT DOCUMENTS

| | | | | | |
|---|---|---|---|---|---|
| CN | 108601017 | A | | 9/2018 | |
| CN | 104904265 | B | | 4/2019 | |
| CN | 110831100 | A | | 2/2020 | |
| CN | 111436088 | A | | 7/2020 | |
| CN | 111526522 | A | | 8/2020 | |
| CN | 111565428 | A | | 8/2020 | |
| CN | 111866972 | A | | 10/2020 | |
| CN | 112243275 | A | | 1/2021 | |
| CN | 112272392 | A | | 1/2021 | |
| CN | 112566203 | A | | 3/2021 | |
| KR | 20150088241 | A | * | 7/2015 | H04W 48/02 |
| WO | WO 2018153274 | A1 | * | 2/2018 | H04W 36/0022 |
| WO | WO 2019072902 | A1 | * | 10/2018 | H04W 36/0061 |

OTHER PUBLICATIONS

Ericsson, "Cell (re)selection related to forbidden PLMNs," 3GPP TSG-RAN WG2 #106, R2-1907597, Reno, USA, 4 pages (May 13-17, 2019).

Intel Corporation, "Remaining FFSs on enabling the UE to camp on non-best cell," 3GPP TSG-RAN WG2 meeting #107bis, R2-1912865, Chongqing, China, 2 pages (Oct. 14-18, 2019).

Intel Corporation, "Enabling the UE to camp on non-best cell," 3GPP TSG-RAN WG2 meeting #106, R2-1906277, Reno, Nevada, US, 4 pages (May 13-17, 2019).

Qin et al., "LTE International Roaming Optimization Scheme Based on Equivalent PLMN," Telecommunications Science, 5 pages, vol. 12 (2015).

Qin et al., "Research on LTE International Roaming Service Strategy," Mobile Communications, 5 pages, vol. 3 (2016).

Huawei, "Discussion on RAN sharing for H(e)NB," 3GPP TSG-RAN WG3 Meeting #74, R2-112779, San Francisco, USA, total 4 pages (Nov. 14-18, 2011).

* cited by examiner p and

CELL RESELECTION METHOD AND TERMINAL DEVICE

CROSS-REFERENCE TO RELATED APPLICATIONS

This application is a national stage of International Application No. PCT/CN2021/127422, filed on Oct. 29, 2021, which claims priority to Chinese Patent Application No. 202110210605.3, filed on Feb. 25, 2021. The disclosures of both of the aforementioned applications are hereby incorporated by reference in their entireties.

TECHNICAL FIELD

This application relates to the field of terminal technologies, and in particular, to a cell reselection method and a terminal device.

BACKGROUND

Currently, some cells in 4G (4th generation) and 5G (5th generation) networks can be jointly established and operated by a plurality of operators. For example, as shown in FIG. 1, a cell 101 established by the operator A and a cell 102 established by the operator B are included in area 1. In addition, the area 1 may also include a co-established cell 103 jointly established by the operator A and the operator B. An operating frequency of mobile phones in the cell 101 is frequency A, and operating frequencies of mobile phones in both the cell 102 and the co-established cell 103 are both frequency B.

In this scenario, after a mobile phone subscribed to the operator A enters the cell 101, the mobile phone uses the cell 101 as a serving cell and camps on the cell 101. When camping on the cell 101, the mobile phone may perform a cell reselection procedure. The cell reselection procedure is a process in which the mobile phone in an idle mode monitors signal quality of neighboring cells and a current serving cell and selects a best cell to provide service signals. For example, if the mobile phone moving to the cell 102 detects that signal quality of the cell 102 is greater than a preset threshold, the mobile phone may obtain a PLMN of the cell 102 by parsing a system message of the cell 102. If the PLMN (public land mobile network) of the cell 102 and a PLMN of the current serving cell (that is, the cell 101) are not EPLMNs (equivalent PLMNs), the mobile phone may prohibit the frequency B corresponding to the cell 102 within a period of time (for example, 300 seconds) according to a related 3GPP protocol.

However, because the frequency of the co-established cell 103 is the same as that of the cell 102 (both being frequency B), if the mobile phone moves to the co-established cell 103 during the period of time when frequency B is prohibited, the mobile phone cannot access the co-established cell 103 through the cell reselection procedure. Consequently, the mobile phone cannot obtain services with better signal quality from the co-established cell 103, degrading mobility performance of the mobile phone.

SUMMARY

This application provides a cell reselection method and a terminal device, so as to enable the terminal device to obtain better signal quality in a co-established cell through a cell reselection procedure, thereby improving mobility performance of the terminal device.

According to a first aspect, this application provides a cell reselection method, including: camping, by a terminal device, on a first cell, where the first cell corresponds to a first frequency, and in the first cell, the first frequency corresponds to a first PLMN; when the terminal device detects that a second cell (the second cell is a neighboring cell of the first cell) satisfies a cell reselection condition and a second PLMN of the second cell and the first PLMN are not EPLMNs, skipping, by the terminal device, performing an action of reselection to the second cell, and adding the second cell to a barred list, where a second frequency corresponding to the second cell is different from the first frequency, and in the second cell, the second frequency corresponds to the second PLMN, for example, the first PLMN may be a PLMN of operator A and the second PLMN may be a PLMN of operator B. Because the terminal device adds the second cell to the barred list based on a cell granularity, instead of adding the second frequency of the second cell to the barred list based on a frequency granularity, when the terminal device subsequently detects that the third cell satisfies the cell reselection condition, and a third PLMN of the third cell and the first PLMN are EPLMNs, even if the third cell and the second cell have the same frequency, the terminal device can still perform an action of reselection to the third cell, where the third cell may correspond to PLMNs of a plurality of operators, for example, the third PLMN of the third cell may include the first PLMN and the second PLMN.

It can be learned that although the third cell and the second cell have the same frequency, because the terminal device can configure the barred list for cell reselection based on the cell granularity, a cell reselection procedure for the third cell with the same frequency is not affected when the terminal device prohibits the second cell, so that the terminal device can successfully access another cell on the same frequency as a forbidden cell through the cell reselection procedure, so as to obtain service signals with better signal quality, improving mobility performance of the terminal device.

In a possible implementation, after the terminal device camps on the first cell, the method further includes: performing, by the terminal device, cell measurement on at least one neighboring cell of the first cell; and when a measurement result of the second cell satisfies the cell reselection condition, obtaining, by the terminal device, the second PLMN of the second cell. That is, the terminal device may first perform cell measurement to obtain a second cell satisfying the cell reselection condition, and then compare PLMNs of two cells to determine whether reselection to the cell can be performed.

Alternatively, the terminal device may first obtain a PLMN of a neighboring cell of the first cell to determine the second PLMN of the second cell whose PLMN is not an EPLMN with the first PLMN, and then during cell reselection, determine whether the second cell satisfies the cell reselection condition.

In a possible implementation, the obtaining the second PLMN of the second cell by the terminal device includes: obtaining, by the terminal device, a SIB message of the second cell; and parsing, by the terminal device, the SIB message of the second cell to obtain the second PLMN of the second cell.

In a possible implementation, the performing, by the terminal device, cell measurement on at least one neighboring cell of the first cell includes: obtaining, by the terminal device, configuration information sent by a network device of the first cell, where the configuration information includes at least one measurement object and a measurement threshold, for example, the measurement object may include information such as a cell identifier and a frequency of the second cell, and the measurement threshold may include a measurement threshold for a serving cell and/or a measurement threshold for the measurement object; and further, performing, by the terminal device, cell measurement according to the configuration information and determining, based on the measurement threshold, whether each cell in the measurement object satisfies the cell reselection condition.

In a possible implementation, the adding, by the terminal device, the second cell to a preset barred list includes: adding, by terminal device, a cell identifier of the second cell and the second frequency to the barred list.

In a possible implementation, when the terminal device detects that the second cell satisfies the cell reselection condition, and the second PLMN of the second cell and the first PLMN are not EPLMNs, the method further includes: obtaining, by the terminal device, at least one parameter of a moving speed, a screen status, and a power level of the terminal device and signal quality of the first cell.

In this case, the adding, by the terminal device, the second cell to a preset barred list may specifically include: when the signal quality of the first cell is less than a preset signal quality threshold, adding, by the terminal device, the second cell to the preset barred list; and/or when the moving speed of the terminal device is greater than a preset speed threshold, adding, by the terminal device, the second cell to the preset barred list; and/or when the terminal device is in a screen-on state, adding, by the terminal device, the second cell to the preset barred list; and/or when the power level of the terminal device is greater than a preset power level threshold, adding, by the terminal device, the second cell to the preset barred list. Certainly, the terminal device may alternatively set, based on the plurality of parameters, a trigger condition for adding the second cell to the preset barred list.

In a possible implementation, when the terminal device detects that the second cell satisfies the cell reselection condition, and the second PLMN of the second cell and the first PLMN are not EPLMNs, the method further includes: determining, by the terminal device, that a first operator to which the first cell belongs has a co-establishment relationship with a second operator to which the second cell belongs. Generally, a cell having a co-establishment relationship may have a same frequency as a cell of one co-establishment party. Therefore, after obtaining the second PLMN of the second cell, the terminal device may inquire whether an operator corresponding to the second cell has a co-establishment relationship with an operator to which the terminal device subscribes. If the co-establishment relationship is present, the terminal device may add the second cell to the preset barred list, so as to avoid subsequently a co-established intra-frequency cell from failing to participate in cell reselection of the terminal device.

In a possible implementation, after the terminal device adds the second cell to the preset barred list, the method further includes: after detecting a signal of the second cell, discarding, by the terminal device, the signal of the second cell by using the barred list, so that the second cell cannot participate in the cell reselection of the terminal device.

In a possible implementation, that the terminal device detects that a second cell satisfies a cell reselection condition includes: when a measurement result of the second cell is greater than a first threshold and a measurement result of the first cell is less than a second threshold, indicating that the signal quality of the second cell is better while the signal quality of the serving cell is poorer, in this case, the terminal device determines that the second cell satisfies the cell reselection condition. Similarly, that the terminal device detects that a third cell satisfies the cell reselection condition includes: when a measurement result of the third cell is greater than the first threshold and a measurement result of the first cell is less than the second threshold, the terminal device determines that the third cell satisfies the cell reselection condition. Certainly, based on one or more of a priority of the frequency of the second cell, a camping time of the terminal device in the first cell, and the like, the terminal device may determine whether the second cell satisfies the cell reselection condition.

In a possible implementation, after the terminal device detects that the third cell satisfies the cell reselection condition, the method further includes: obtaining, by the terminal device, the third PLMN of the third cell, where, for example, the terminal device may parse a SIB message of the third cell to obtain the third PLMN of the third cell, and when the third cell is a co-established cell of a plurality of operators, the third PLMN of the third cell includes PLMNs of a plurality of operators; and then, when one PLMN in the third PLMN and the first PLMN are EPLMNs, determining, by the terminal device, that the third PLMN and the first PLMN are EPLMNs.

According to a second aspect, this application provides a cell reselection method, including: camping, by a terminal device, on a first cell, where the first cell corresponds to a first frequency, where the terminal device may determine, based on frequencies of cells, that a corresponding cell is a 4G cell or a 5G cell; when the terminal device detects that a second cell (the second cell is an NSA cell) in 5G cells satisfies a cell reselection condition, and reselection to another intra-frequency cell is not allowed for the second cell, skipping, by the terminal device, performing an action of reselection to the second cell, and adding the second cell to a preset barred list, where a second frequency corresponding to the second cell is different from the first frequency; and when the terminal device detects that a third cell (the third cell is an SA cell) in the 5G cells satisfies the cell reselection condition, and a PLMN of the third cell and a PLMN of the first cell are EPLMNs, performing, by the terminal device, an action of reselection to the third cell, where a frequency of the third cell is the same as the second frequency.

Similar to the first aspect, although the SA cell and the NSA cell have a same frequency, because the terminal device can configure the barred list for cell reselection based on a cell granularity, when the terminal device subsequently detects that an SA cell (that is, the third cell) on a same frequency as the second cell satisfies the cell reselection condition, the terminal device can still access the third cell through a normal cell reselection procedure, so that the terminal device can successfully access the SA cell on the same frequency as the forbidden NSA cell through the cell reselection procedure when moving between the SA cell and the NSA cell on the same frequency, so as to obtain service signals with better signal quality, improving mobility performance of the terminal device.

In a possible implementation, after the terminal device camps on the first cell, the method further includes: performing, by the terminal device, cell measurement on at least one neighboring cell of the first cell; when a measurement result of the second cell satisfies the cell reselection condition, determining, by the terminal device, whether the second cell is an NSA cell; and if the second cell is an NSA cell, determining, by the terminal device, that reselection to another intra-frequency cell is not allowed for the second cell.

For example, the determining, by the terminal device, whether the second cell is an NSA cell includes: obtaining, by the terminal device, a SIB message of the second cell; and when no TAC corresponding to a PLMN of the second cell is configured in the SIB message of the second cell, determining, by the terminal device, that the second cell is an NSA cell; otherwise, determining, by the terminal device, that the second cell is an SA cell.

For example, the determining, by the terminal device, that reselection to another intra-frequency cell is not allowed for the second cell includes: obtaining, by the terminal device, a master information block MIB message of the second cell; and when an option of reselection to another intra-frequency cell not allowed is configured in the MIB message of the second cell, determining, by the terminal device, that reselection to another intra-frequency cell is not allowed for the second cell.

That is, after the terminal device determines that the second cell is an NSA cell in the 5G cells, a trigger condition for prohibiting the second cell by the terminal device changes from the PLMN of the second cell and the PLMN of the first cell being not EPLMNs in the first aspect to the option of intra-frequency cell reselection not allowed being configured in the MIB message of the second cell.

In a possible implementation, after the terminal device adds the second cell to the preset barred list, the method further includes: when the terminal device detects that the third cell satisfies a cell selection condition, and the PLMN of the third cell and the PLMN of the first cell are EPLMNs, performing, by the terminal device, an action of selection to the third cell.

That is, the barred list in the second aspect is not only applicable to the subsequent cell reselection procedure, but also applicable to the subsequent cell selection procedure. In this way, when the terminal device subsequently detects that the SA cell (that is, the third cell) on the same frequency as the second cell satisfies the cell selection condition, the terminal device can still access the third cell through the normal cell selection procedure, so that the terminal device can successfully access the SA cell on the same frequency as the forbidden NSA cell through the cell reselection procedure to obtain service signals with better signal quality, improving mobility performance of the terminal device.

In a possible implementation, when the terminal device detects that the second cell satisfies the cell reselection condition, and reselection to another intra-frequency cell is not allowed for the second cell, the method further includes: obtaining, by the terminal device, at least one parameter of a moving speed, a screen status, and a power level of the terminal device and signal quality of the first cell.

In this case, the adding, by the terminal device, the second cell to a preset barred list includes: when the signal quality of the first cell is less than a preset signal quality threshold, adding, by the terminal device, the second cell to the preset barred list; and/or when the moving speed of the terminal device is greater than a preset speed threshold, adding, by the terminal device, the second cell to the preset barred list; and/or when the terminal device is in a screen-on state, adding, by the terminal device, the second cell to the preset barred list; and/or when the power level of the terminal device is greater than a preset power level threshold, adding, by the terminal device, the second cell to the preset barred list.

In a possible implementation, the adding, by the terminal device, the second cell to a preset barred list includes: adding, by terminal device, a cell identifier of the second cell and the second frequency to the barred list.

According to a third aspect, this application provides a terminal device, including: a memory, a communications module, and one or more processors, where the memory and the communications module are coupled to the processor. The memory is configured to store computer program code, and the computer program code includes computer instructions. When the terminal device is running, the processor is configured to execute one or more computer instructions stored in the memory, so that the terminal device executes the cell reselection method according to any one of the first aspect or the second aspect.

According to a fourth aspect, this application provides a computer-readable storage medium, where the computer-readable storage medium includes computer instructions. When the computer instruction runs on a terminal device, the terminal device is caused to execute the cell reselection method according to any one of the first aspect or the second aspect.

According to a fifth aspect, this application provides a computer program product, where when the computer program product runs on a terminal device, the terminal device is caused to execute the cell reselection method according to any one of the first aspect or the second aspect.

It can be understood that the terminal device, the computer-readable storage medium, and the computer program product provided in the foregoing aspects are all applicable to the corresponding method described above. Therefore, for beneficial effects that can be achieved thereby, refer to the beneficial effects of the corresponding methods described above. Details are not described herein again.

DETAILED DESCRIPTION OF EMBODIMENTS

Figure 1:
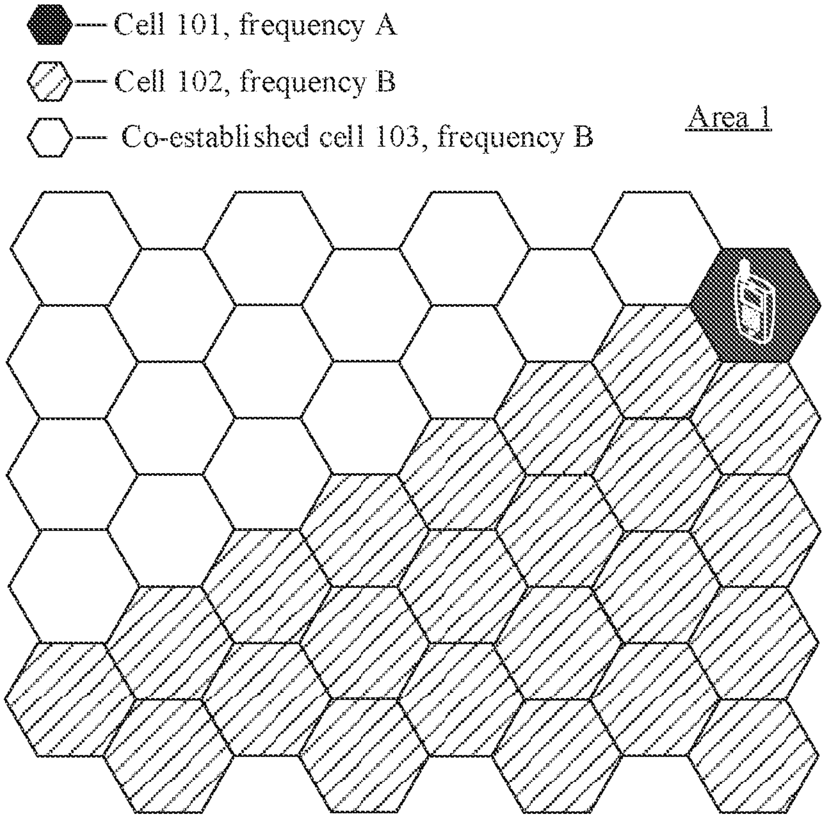
FIG. 1 is a first schematic diagram of an application scenario of a cell reselection procedure in the prior art.

The terms "first" and "second" described below are used only for ease of description and cannot be construed as indicating or implying relative importance or implicitly indicating a quantity of technical features. Therefore, a feature limited by "first" or "second" may explicitly or implicitly include one or more features. In the description of the embodiments, unless otherwise specified, the term "a plurality of" means two or more.

In order to facilitate understanding of the technical solutions of the embodiments of this application, related technologies of this application are first briefly described as follows.

A PLMN (public land mobile network) indicates a network established and operated for the purpose of providing land mobile communication services to the public. PLMN=MCC (mobile country code)+MNC (mobile network code). PLMNs of different operators are generally different.

One terminal device usually needs to maintain several different types of PLMN lists. For example, PLMNs may be classified into RPLMNs (registered PLMNs), HPLMNs (home PLMNs), EPLMNs (equivalent PLMNs), VPLMNs (visited PLMNs), UPLMNs (user controlled PLMNs), OPLMNs (operator controlled PLMNs), FPLMNs (forbidden PLMNs), and so on.

The EPLMN is a PLMN having a same status as a PLMN currently selected by the terminal device, with a same priority. For example, PLMNs of China Mobile have three number segments: 46000, 46002, and 46007. 46002 is an EPLMN of 46000.

A cell indicates an area for providing wireless communication services for terminal devices, where network devices (such as access network devices or core network devices) provide wireless communication services for terminal devices in this area. For example, a cell may be a cellular area. One network device can manage one or more cells. Each cell corresponds to one cell identifier (cell ID), and the cell identifier uniquely identifies the cell. If the terminal device camps on a specific cell, the cell may be referred to as a camped cell or a serving cell of the terminal device. Cells around the serving cell and adjacent to the serving cell may be referred to as neighboring cells of the serving cell or neighboring areas.

Generally, cells of the same operator have a same frequency, and cells of different operators have different frequencies. For example, if a cell A and a cell B are both cells of operator A, frequencies of the cell A and the cell B are both frequency 1, and PLMNs of the cell A and the cell B are both PLMN 1. If a cell C is a cell of operator B, frequency 2 of the cell C is generally different from the frequency 1, and a PLMN of the cell C is also different from the PLMN of the cell A (or the cell B). For example, the PLMN of the cell C is PLMN 2.

At present, there is also a special type of cell (for example, a cell D), and the cell D is able to serve terminal devices subscribed to a plurality of operators. For example, the cell D may be a cell jointly established by the operator A and the operator B, and a frequency of the cell D is frequency 2, that is, the cell D is an intra-frequency cell of the cell C, and this type of cell may be referred to as a co-established cell in the following embodiments. The cell D can provide services to terminal devices subscribed to the operator A, and can also provide services to terminal devices subscribed to the operator B.

The frequency of the cell D may be the frequency 1 or the frequency 2. Regardless of whether the frequency of the cell D is the frequency 1 or the frequency 2, the cell D has two PLMNs: one is a PLMN belonging to the operator A (for example, the PLMN 1), and the other is a PLMN belonging to the operator B (for example, the PLMN 2). In this case, when one of PLMN 1 and PLMN 2 is an EPLMN with a PLMN of the serving cell, it can be considered that the PLMN of the cell D and the PLMN of the serving cell are EPLMNs.

It should be noted that the co-established cell may alternatively be a cell co-established by three or more operators, which is not limited in the embodiments of this application. In addition to a manner of cell co-establishment by a plurality of operator to obtain one cell corresponding to a plurality of operators, those skilled in the art can alternatively set a cell to be corresponding to a plurality of operators based on actual experience or actual application scenarios. In the following embodiments, the co-established cell jointly established by the operator A and the operator B is used as an example for description.

The cell reselection procedure is a process in which the mobile phone in an idle mode monitors signal quality of neighboring cells and a current serving cell and selects a best cell to provide service signals.

For example, still as shown in FIG. 1, a cell 101 established by the operator A is included in area 1, and a frequency of the cell 101 is frequency A. A cell 102 established by the operator B is also included in the area 1, and a frequency of the cell 102 is frequency B. A co-established cell 103 jointly established by the operator A and the operator B is further included in the area 1, and a frequency of the cell 103 may be the same as that of the cell 102, that is, the cell 103 is a co-established cell on a same frequency as the cell 102. The terminal device being moving in the area 1 may access a cell with better signal quality through the cell reselection procedure, so as to obtain services with better signal quality.

Figure 2:
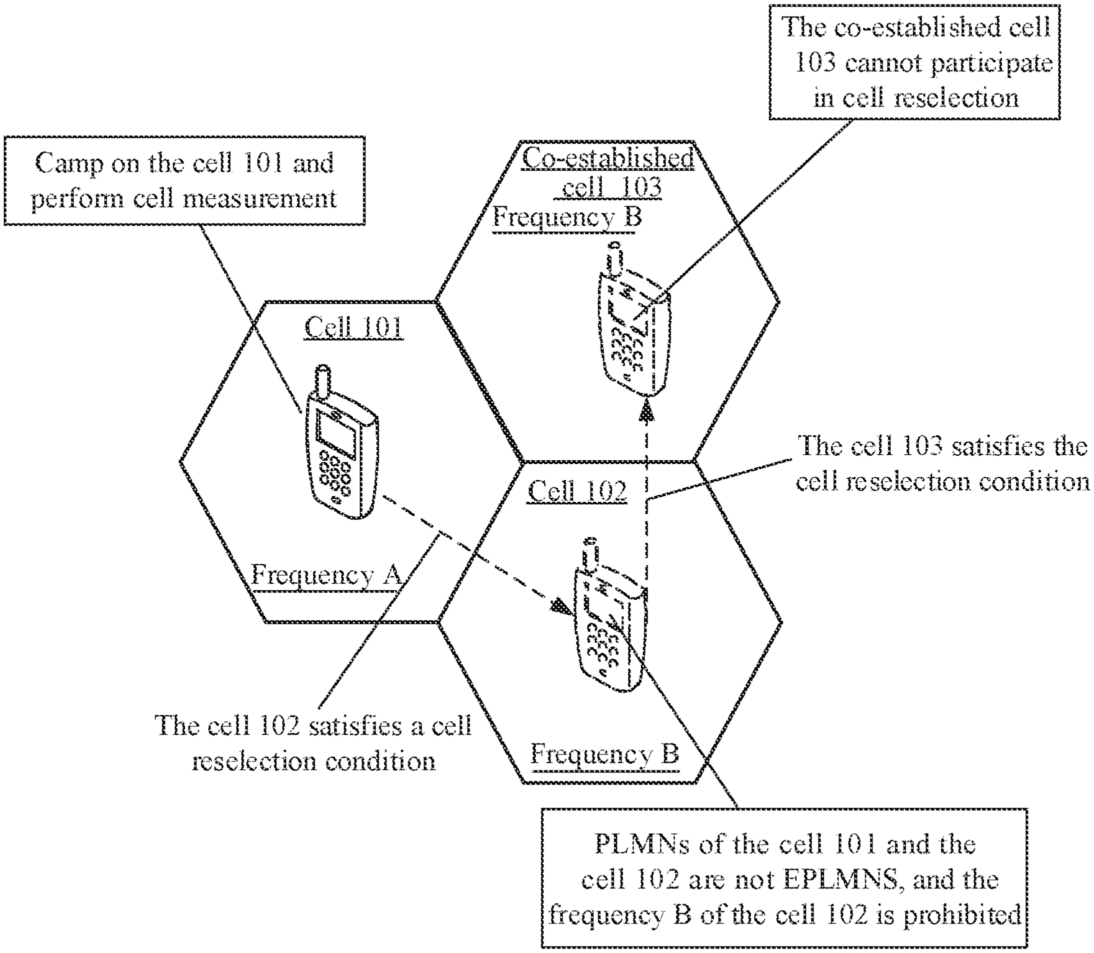
FIG. 2 is a second schematic diagram of an application scenario of a cell reselection procedure in the prior art.

Using the terminal device subscribed to the operator A as an example, as shown in FIG. 2, when being located in the cell 101, the terminal device uses the cell 101 as a serving cell and camps on the cell 101. In addition, the terminal device in the idle mode may measure signal quality of neighboring cells and the current serving cell to determine whether the signal quality of the neighboring cells and the current serving cell satisfy a reselection condition (reselection rules). For example, when it is detected that signal quality of the cell 102 is greater than a preset value 1 and signal quality of the cell 101 is less than a preset value 2 (the preset value 2 is less than or equal to the preset value 1), the cell 102 satisfies the cell reselection condition. In this case, the terminal device may use the cell 102 as a candidate cell and obtain a system message 1 broadcast in the cell 102. The terminal device parses the system message 1 to obtain a PLMN of the cell 102, that is, a PLMN of the operator B. Because the PLMN of the operator B and the PLMN of the operator A (that is, the PLMN of the cell 101) are not EPLMNs, the terminal device may prohibit the frequency B of the cell 102 for a duration of 300 seconds according to section 36.304 5.2.4.4 of the 3GPP protocol. That is, within 300 seconds, the terminal device cannot use a cell whose frequency is frequency B as the target cell for cell reselection, thereby reducing power consumption of the terminal device.

Related regulations in section 36.304 5.2.4.4 of the 3GPP protocol are as follows:

If the highest ranked cell or best cell according to absolute priority reselection rules is an intra-frequency or inter-frequency cell which is not suitable for a CN type due to being part of the "list of forbidden TAs for roaming" or belonging to a PLMN which is not indicated as being equivalent to the registered PLMN, the UE shall not consider this cell and other cells on the same frequency, as candidates for reselection for the CN type for a maximum of 300 seconds.

If the UE enters into state any cell selection, any limitation shall be removed.

If the UE is redirected under E-UTRAN control to a frequency for which the timer is running, any limitation on that frequency shall be removed.

However, in this scenario, as shown in FIG. 2, when the terminal device subsequently approaches or moves to the co-established cell 103, because frequencies of both the co-established cell 103 and the cell 102 are frequency B, even if the signal quality of the co-established cell 103 is greater than the preset value 1 and the signal quality of the cell 101 is less than the preset value 2 (that is, the cell reselection condition is satisfied), the terminal device cannot use the co-established cell 103 as a target cell to access the co-established cell 103. In this way, the terminal device still camps on the cell 101, affecting both mobility performance of the terminal device and obtained signal quality.

Figure 3:
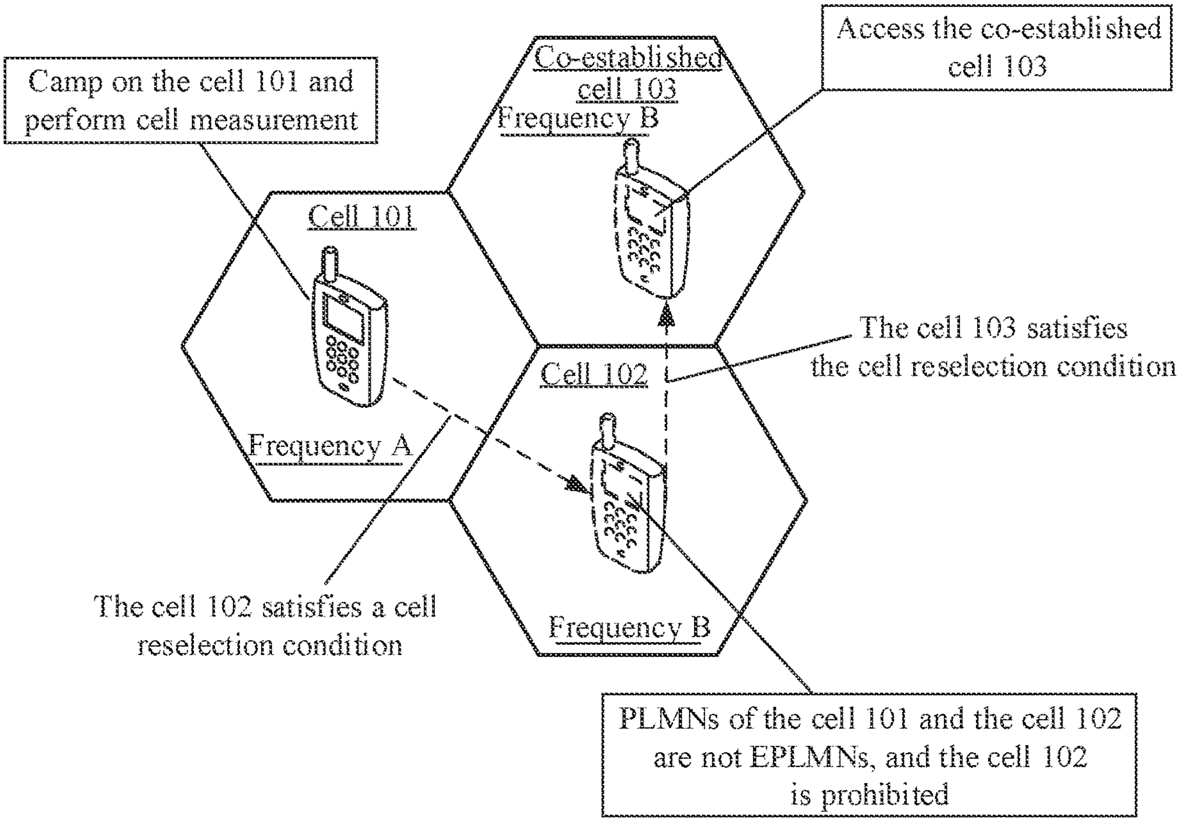
FIG. 3 is a first schematic diagram of an application scenario of a cell reselection method according to an embodiment of this application.

In view of this, in the embodiments of this application, still using the foregoing scenario as an example, as shown in FIG. 3, when the terminal device detects that the signal quality of the cell 102 and that of the current serving the cell 101 meet the cell reselection condition, if the PLMN of the cell 102 (that is, the PLMN of the operator B) and the PLMN of the cell 101 (that is, the PLMN of the operator A) are not EPLMNs, the terminal device may add the cell 102 to a barred list for cell reselection, instead of adding the frequency B of the cell 102 to the barred list.

Subsequently, the terminal device cannot use the cell 102 included in the barred list as the target cell for cell reselection. However, as shown in FIG. 3, when the terminal device detects that the signal quality of the co-established cell 103 and that of the current serving cell (that is, the cell 101) satisfy the reselection condition, because the co-established cell 103 is not included in the barred list, the terminal device can still use the co-established cell 103 as the target cell to access the co-established cell 103 through the existing cell reselection procedure.

In this way, although the frequency of the co-established cell 103 is the same as that of the cell 102, because the terminal device can configure a barred list for cell reselection based on a cell granularity, the terminal device prohibits, during cell reselection, the cell 102 that is not included in the EPLMN list, which does not affect the cell reselection procedure for the co-established cell 103 on the same frequency. In this way, when the terminal device moves in such scenario with a co-established cell, the co-established cell can effectively provide service signals to the terminal device, improving mobility performance of the terminal device.

The specific solution of configuring the barred list based on the cell granularity in the cell reselection procedure is to be described in detail in the following embodiments.

It should be noted that the technical solutions in the embodiments of this application can be applied to various communications systems, for example, orthogonal frequency-division a plurality of access (OFDMA), single carrier frequency division a plurality of access (single carrier FDMA, SC-FDMA), non-terrestrial network (NTN), or other systems. The term "system" can be used interchangeably with "network". The OFDMA system can implement wireless technologies such as evolved universal terrestrial radio access (E-UTRA) or ultra mobile broadband (UMB). E-UTRA is an evolved version of the universal mobile telecommunications system (UMTS). Long term evolution (LTE) and various LTE-based versions for the 3rd generation partnership project (3GPP) are new version using E-UTRA. The 5th generation (5G) communications system is the next generation communications system under research. The 5G communications system includes a non-standalone (NSA) 5G mobile communications system, a standalone (SA) 5G mobile communications system, or both the NSA 5G mobile communications system and the SA 5G mobile communications system. In addition, the communications system may also be applicable to future-oriented communications technologies (for example, a 6G mobile communication system), to which the technical solutions provided in the embodiments of this application are all applicable. The foregoing communications systems to which this application is applicable are only examples, and the communications systems to which this application is applicable are not limited thereto. This is just described here and will not be repeated below.

Optionally, a network device in the embodiments of this application is a radio access network (RAN) node through which the terminal device accesses a wireless network, including but not limited to an evolved base station in LTE, a base station (gNodeB or gNB) or a transmission and reception point (TRP) in NR, an evolved Node B (eNodeB), a radio network controller (RNC), a Node B (NB), a base station controller (BSC), a base transceiver station (BTS), baseband unit (BBU), a transmitting point (TP), a later 3GPP evolved base station, an access node in a Wi-Fi system, a wireless relay node, a wireless backhaul node, and the like. The base station may be a macro base station, a micro base station, a pico base station, a small cell, a relay station, or a balloon station, or the like, which is not specifically limited in the embodiments of this application.

Optionally, the terminal device in the embodiments of this application may be a device for implementing a wireless communication function, such as a terminal or a chip that can be used in the terminal. The terminal may be a user equipment (UE), an access terminal, a terminal unit, a terminal station, a mobile station, a mobile, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device with wireless communication function, a computing device, or other processing devices connected to wireless modems, an in-vehicle device, or a wearable device, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, or a wireless terminal in smart home. The terminal may be mobile or stationary.

Optionally, the network device and the terminal device in the embodiments of this application may also be referred to as a communications device, which may be a general-purpose device or a dedicated device. This is not specifically limited in the embodiments of this application.

Figure 4:
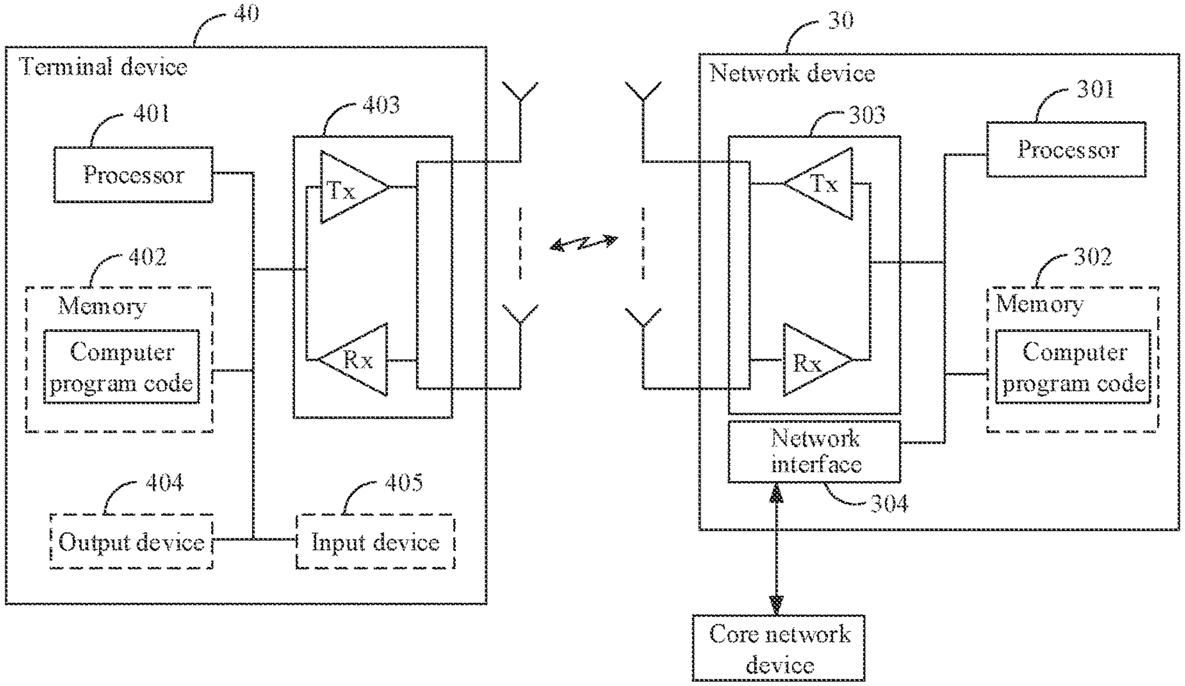
FIG. 4 is a schematic structural diagram of a terminal device and a network device according to an embodiment of this application.

As shown in FIG. 4, FIG. 4 is a schematic structural diagram of a network device 30 and a terminal device 40 according to an embodiment of this application.

The terminal device 40 includes at least one processor (for example, in FIG. 4, one processor 401 being included is used as an example for description) and at least one transceiver (for example, in FIG. 4, one transceiver 403 being included is used as an example for description). Optionally, the terminal device 40 may further include at least one memory (for example, in FIG. 4, one memory 402 being included is used as an example for description), at least one output device (for example, in FIG. 4, one output device 404 being included is used as an example for description), and at least one input device (for example, in FIG. 4, one input device 405 being included is used as an example for description).

The processor 401, the memory 402, and the transceiver 403 are connected by a communication line. The communication line may include a channel and transfers information between the foregoing components.

The processor 401 may be a general-purpose central processing unit (CPU), a microprocessor, an application-specific integrated circuit (ASIC), or one or more integrated circuits for controlling execution of a solution program of this application. In a specific implementation, as an embodiment, the processor 401 may also include a plurality of CPUs, and the processor 401 may be a single-core (single-CPU) processor or a multi-core (multi-CPU) processor. The processor herein may be one or more devices, circuits, or processing cores for processing data (for example, computer program instructions).

The memory 402 may be an apparatus having a storage function. For example, the memory 402 may be a read-only memory (ROM) or another type of static storage device that may store static information and instructions, or a random access memory (RAM) or another type of dynamic storage device that may store information and instructions, or may be an electrically erasable programmable read-only memory (EEPROM), a read-only optical disc (e.g., compact disc read-only memory (CD-ROM)) or another optical disc storage medium, optical disk storage medium (including a compact disk, a laser disk, an optical disc, a digital versatile disc, a Blu-ray disc, or the like), or a magnetic disk storage medium or another magnetic storage device, or any other medium that can be used to carry or store expected program code in a structural form of an instruction or data and that can be accessed by a computer, which is not limited thereto. The memory 402 may be independent, and is connected to the processor 401 by using the communication line. The memory 402 may be integrated with the processor 401.

The memory 402 is configured to store computer-executed instructions for executing the solutions of this application, and the execution is controlled by the processor 401. Specifically, the processor 401 is configured to execute the computer-executed instructions stored in the memory 402, so as to implement the measurement method described in the embodiments of this application. Optionally, the computer-executed instructions in the embodiments of this application may also be referred to as application program code or computer program code, which is not specifically limited in the embodiments of this application.

The transceiver 403 may be any transceiver-like apparatus for communicating with other devices or a communications network, such as Ethernet, RAN, or wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive a user input in a plurality of manners. For example, the input device 405 may be a mouse, a keyboard, a touchscreen device, a sensor device, or the like.

The network device 30 includes at least one processor (for example, in FIG. 4, one processor 301 being included is used as an example for description), at least one transceiver (for example, in FIG. 4, one transceiver 303 being included is used as an example for description), and at least one network interface (for example, in FIG. 4, one network interface 304 being included is used as an example for description). Optionally, the network device 30 may further include at least one memory (for example, in FIG. 4, one memory 302 being included is used as an example for description). The processor 301, the memory 302, the transceiver 303, and the network interface 304 are connected through a communication line. The network interface 304 is configured to connect to a core network device through a link (for example, an Si interface), or connect to a network interface of another network device through a wired or wireless link (for example, an X2 interface) (not shown in FIG. 4). This is not specifically limited in the embodiments of this application. In addition, for related descriptions about the processor 301, the memory 302, and the transceiver 303, reference may be made to the descriptions of the processor 401, the memory 402, and the transceiver 403 of the terminal device 40, and details are not repeated herein.

Figure 5:
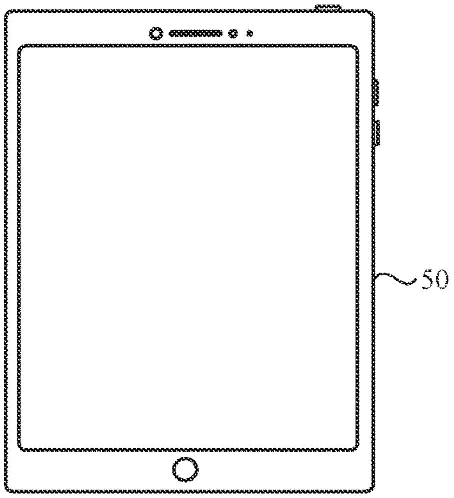
FIG. 5 is a first schematic structural diagram of a terminal device according to an embodiment of this application.

For example, the terminal device 40 shown in FIG. 4 may specifically be a mobile phone, a tablet computer, a notebook computer, an ultra-mobile personal computer (UMPC), a handheld computer, a netbook, a personal digital assistant (PDA), a wearable electronic device, an in-vehicle device (also referred to as vehicle-mounted device), a virtual reality device, or the like, which are not limited in the embodiments of this application. For example, as shown in FIG. 5, the terminal device 40 may specifically be a tablet computer 50. The tablet computer 50 may have a communication function to implement the cell reselection method provided by the embodiments of this application.

Figure 6:
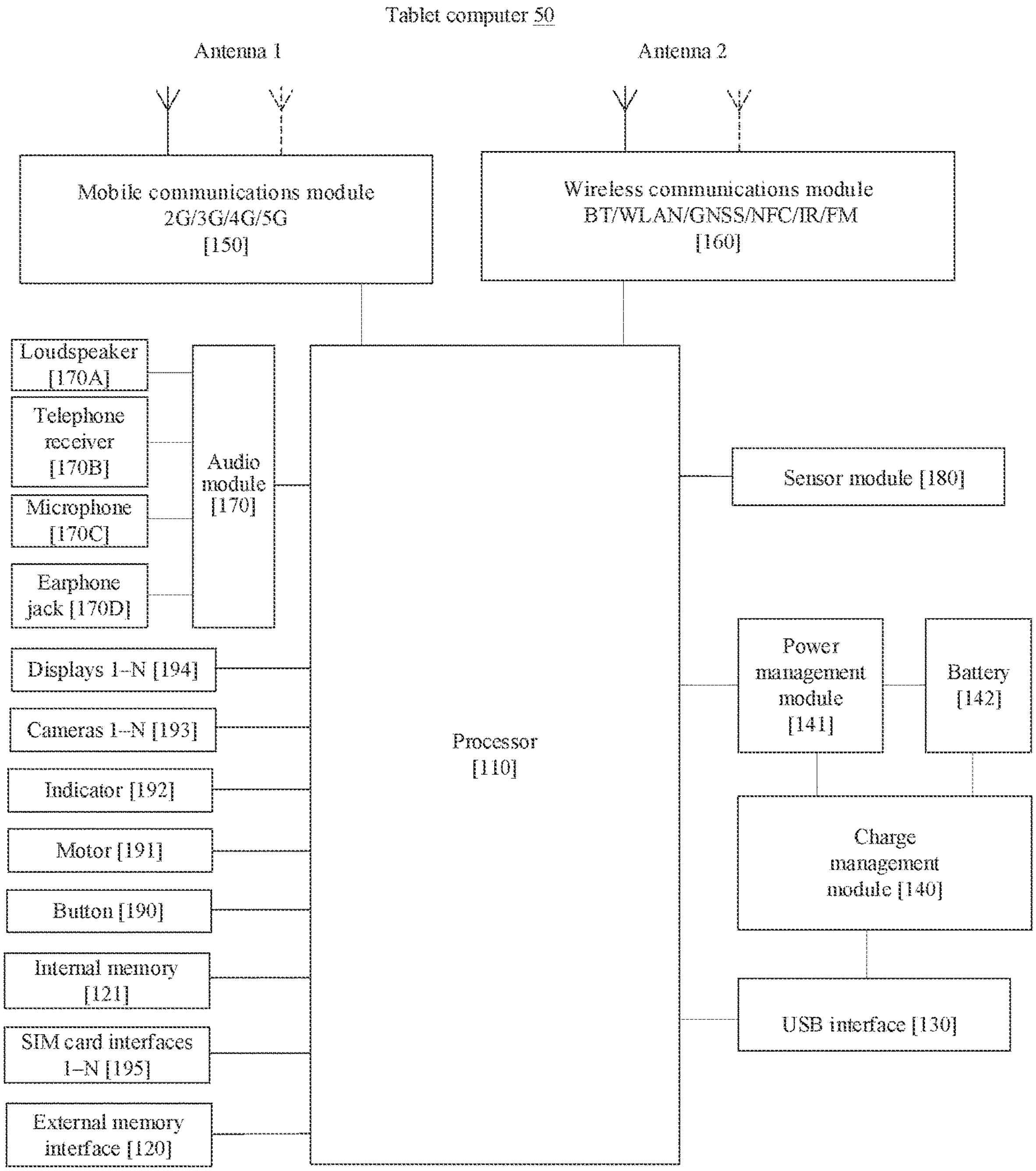
FIG. 6 is a second schematic structural diagram of a terminal device according to an embodiment of this application.

As shown in FIG. 6, FIG. 6 is a specific structural form of a tablet computer 50 according to an embodiment of this application.

In some embodiments, functions of the processor 401 in FIG. 4 may be implemented by a processor 110 in FIG. 6.

In some embodiments, functions of the transceiver 403 in FIG. 4 may be implemented by an antenna 1, an antenna 2, a mobile communications module 150, a wireless communications module 160, and the like in FIG. 6.

The antenna 1 and the antenna 2 are configured to transmit and receive electromagnetic wave signals. Each antenna in the tablet computer 50 may be configured to cover one or more communication bands. In addition, different antennas may be multiplexed to improve utilization of the antennas. For example, the antenna 1 may be multiplexed as a diversity antenna used in a wireless local area network. In some other embodiments, the antenna may be used in combination with a tuning switch.

The mobile communications module 150 may provide wireless communication solutions for use on the tablet computer 50, including 2G, 3G, 4G, 5G, and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit the processed electromagnetic wave to a modem processor for demodulation. The mobile communications module 150 may further amplify a signal modulated by the modem processor, and convert the signal into an electromagnetic wave and radiate the electromagnetic wave by using the antenna 1. In some embodiments, at least some functional modules of the mobile communications module 150 may be provided in the processor 110. In some embodiments, at least part of functional modules of the mobile communications module 150 may be provided in a same component as at least part of modules of the processor 110.

The wireless communications module 160 may provide wireless communication solutions for the tablet computer 50, including wireless local area network (WLAN) (for example, a Wi-Fi network), Bluetooth (BT), global navigation satellite system (GNSS), frequency modulation (FM), near field communication (NFC), infrared (IR) technology, and the like. The wireless communications module 160 may be one or more components integrating at least one communication processing module. The wireless communications module 160 receives an electromagnetic wave by using the antenna 2, performs frequency modulation and filtering processing on an electromagnetic wave signal, and sends a processed signal to the processor 110. The wireless communications module 160 may also receive a to-be-sent signal from the processor 110, perform frequency modulation and amplification on the signal, and convert the signal into an electromagnetic wave and radiate the electromagnetic wave by using the antenna 2. When the tablet computer 50 is a first device, the wireless communications module 160 can provide a solution of NFC wireless communication applied to the tablet computer 50, which means that the first device includes an NFC chip. The NFC chip can improve the NFC wireless communication function. When the tablet computer 50 is a second device, the wireless communications module 160 can provide a solution of NFC wireless communication applied to the tablet computer 50, which means that the first device includes an electronic tag (such as a radio frequency identification (RFID) tag). An NFC chip of another device moving close to the electronic tag can perform NFC wireless communication with the second device.

In some embodiments, in the tablet computer 50, the antenna 1 is coupled to the mobile communications module 150, and the antenna 2 is coupled to the wireless communications module 160, so that the tablet computer 50 can communicate with a network and other devices by using a wireless communication technology. The wireless communication technology may include global system for mobile communications (GSM), general packet radio service (GPRS), code division a plurality of access (CDMA), wideband code division a plurality of access (WCDMA), time-division code division a plurality of access (TD-SCDMA), LTE, BT, GNSS, WLAN, NFC, FM, IR technology, or the like. The GNSS may include the global positioning system (GPS), the global navigation satellite system (GLONASS), the Beidou navigation satellite system (BDS), the quasi-zenith satellite system (QZSS), satellite based augmentation system (SBAS), or other positioning systems.

In some embodiments, the functions of the memory 402 in FIG. 4 may be implemented by an internal memory 121 in FIG. 6 or an external memory (for example, a micro SD card) connected to an external memory interface 120.

In some embodiments, functions of the output device 404 in FIG. 4 may be implemented by a display 194 in FIG. 6. The display 194 is configured to display images, videos, and the like. The display 194 includes a display panel.

In some embodiments, functions of the input device 405 in FIG. 4 may be implemented by a mouse, a keyboard, a touchscreen device, or a sensor module 180 in FIG. 6. For example, as shown in FIG. 6, the sensor module 180 may include, for example, a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like, which is not specifically limited in the embodiments of this application.

In some embodiments, as shown in FIG. 6, the tablet computer 50 may further include one or more of an audio module 170, a camera 193, an indicator 192, a motor 191, a button 190, a SIM card interface 195, a USB interface 130, a charge management module 140, a power management module 141, and a battery 142. The audio module 170 may be connected to a loudspeaker 170A (also referred to as "speaker"), a telephone receiver 170B (also referred to as "earpiece"), a microphone 170C (also referred to as "mic" or "mike"), an earphone jack 170D, or the like, which is not specifically limited in the embodiments of this application.

It should be noted that the structure shown in FIG. 6 does not constitute any specific limitation on the tablet computer 50. For example, in some other embodiments of this application, the tablet computer 50 may include more or fewer components than shown in the figure, or combine some components, or split some components, or have different component arrangements. The components shown in the figure may be implemented in hardware, software, or a combination of software and hardware.

The following describes in detail a cell reselection method provided by the embodiments of this application with reference to the accompanying drawings.

Figure 7:
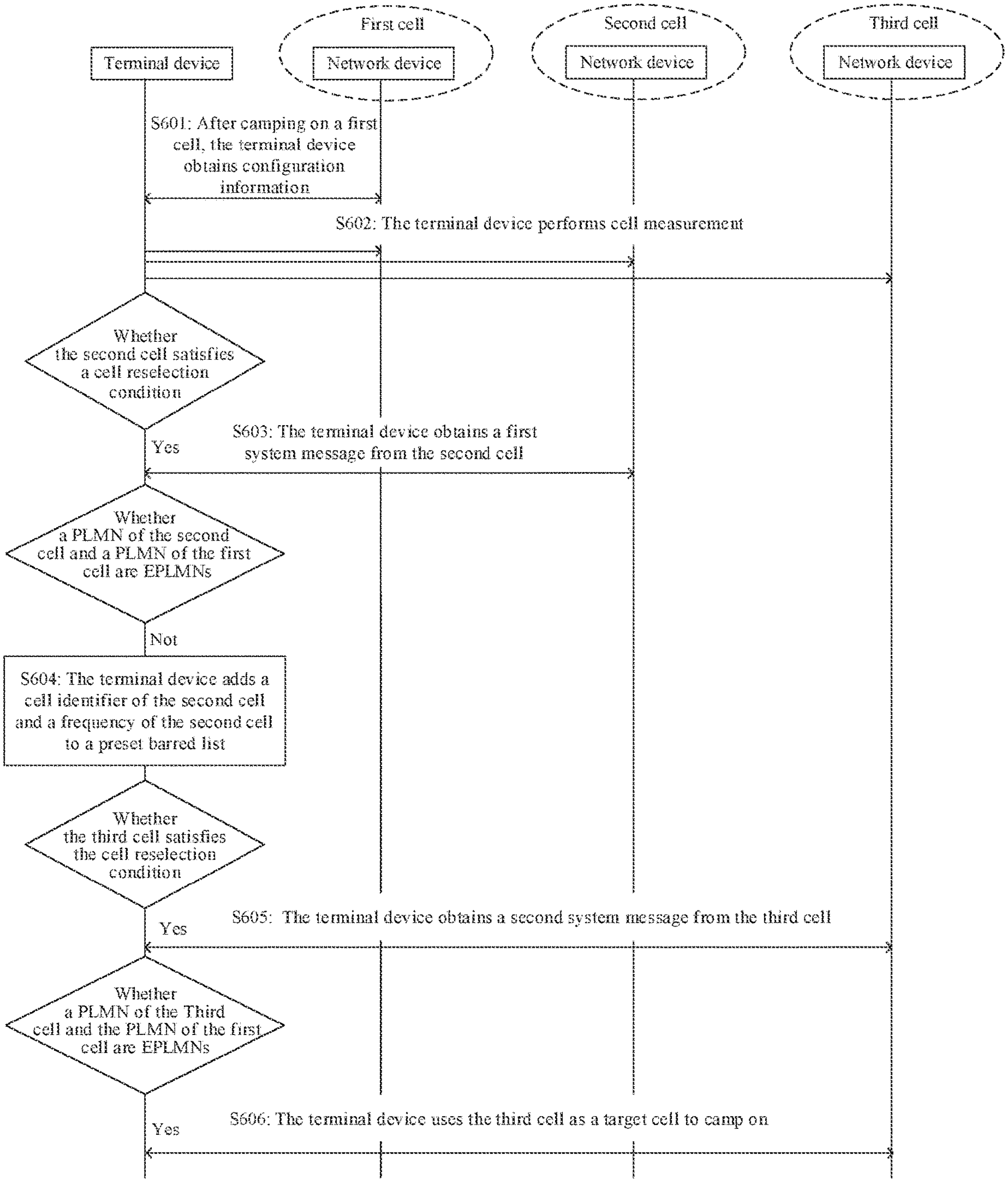
FIG. 7 is a first schematic diagram of interaction of a cell reselection method according to an embodiment of this application.

As shown in FIG. 7, a cell reselection method provided in an embodiment of this application may include the following steps S601 to S606.

S601: After camping on a first cell, a terminal device obtains configuration information for cell reselection sent by a network device.

Using the first cell being a cell established by operator A as an example, if the terminal device has subscribed to the operator A, the terminal device is able to access cells established by the operator A in different places and enjoy signal services provided by the operator A. In some embodiments, the operator A may establish a cooperative relationship with one or more other operators. For example, the operator A and operator B may jointly establish a co-established cell 1. In this case, terminal devices subscribed to the operator A can access the co-established cell 1, and terminal devices subscribed to the operator B can also access the co-established cell 1.

Generally, network frequency band ranges allocated for different operators are different. For example, a frequency band range obtained by the operator A is frequency 1 to frequency 2, and a frequency band range obtained by the operator B is frequency 3 to frequency 4. Different operators may allocate a frequency for their own cells within respective frequency bands, so that terminal devices accessing a corresponding cell can work under a corresponding frequency. For example, the operator A may set a frequency of the first cell to be frequency A within the range of frequency 1 to frequency 2; in this case, an operating frequency of the terminal device accessing the first cell is the frequency A. For another example, the operator B can set a frequency of a second cell to be frequency B within the range of frequency 3 to frequency 4; in this case, an operating frequency of the terminal device accessing the second cell is the frequency B. For the co-established cell 1, the frequency A or the frequency B may be set for the co-established cell. That is, the frequency of the co-established cell may be the same as a frequency that is set for cells by an operator participating in the co-establishment. Certainly, the network frequency band ranges of different operators possibly overlap, which is not limited in this embodiment of this application.

In addition, frequency band ranges used by different communications systems are also different. For example, a frequency band range used by a 4G communications system (also referred to as 4G network) is frequency band range 1, and a frequency band range used by a 5G communications system (also referred to 5G network) is frequency band range 2, where the frequency band range 2 is different from the frequency band range 1. In the frequency band range 1, different operators have corresponding frequency band ranges; and in the frequency band range 2, different operators also have corresponding frequency band ranges. Then, based on frequencies of the cells, the terminal device can determine whether a corresponding cell cover a 4G network or a 5G network.

Figure 8:
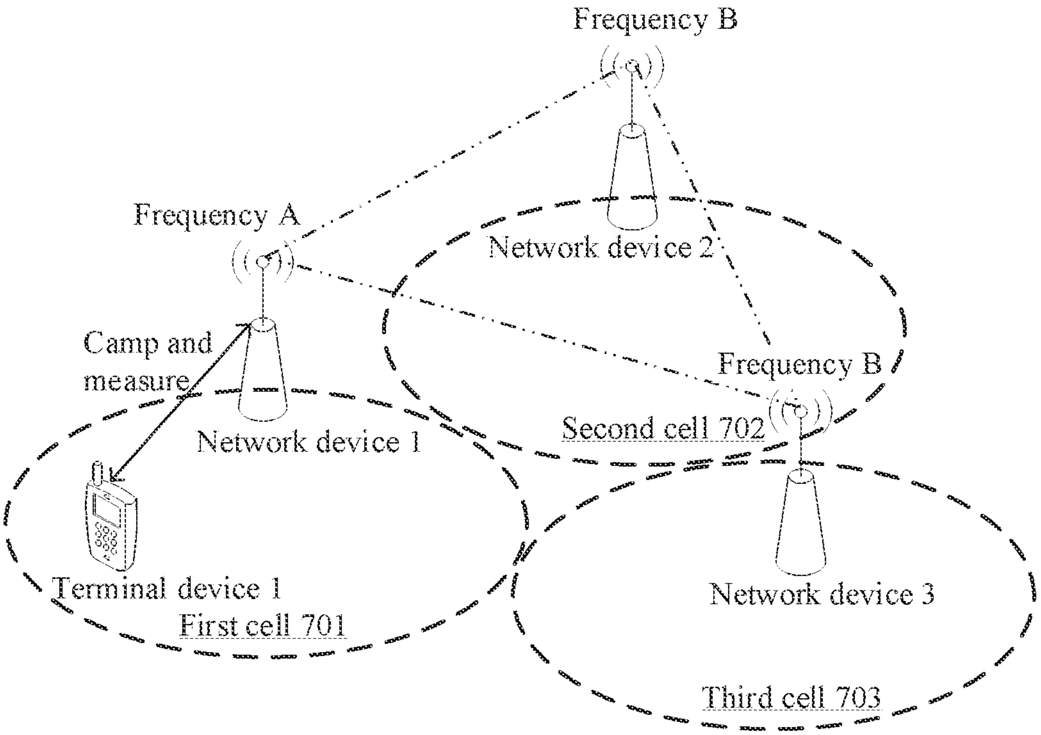
FIG. 8 is a second schematic diagram of an application scenario of a cell reselection method according to an embodiment of this application.

For example, in step S601, as shown in FIG. 8, after approaching or entering a first cell 701, a terminal device 1 subscribed to the operator A can obtain, through searching, signals provided within the first cell 701 by a network device 1 of the first cell 701. Further, the terminal device 1 may access and camp on the first cell 701 on the frequency A through existing cell selection and cell camping procedures. For example, the terminal device 1 may first perform downlink synchronization with the network device 1, and then the terminal device 1 may determine whether the first cell 701 satisfies an "S criterion" (the "S criterion" is a condition that needs to be satisfied in the cell selection procedure, as defined in LTE). If the "S criterion" is satisfied, the terminal device 1 may use the first cell 701 as a serving cell (also referred to as a camping cell) to camp on.

The network device 1 of the first cell 701 may periodically monitor cell information such as frequencies of neighboring cells. For example, still as shown in FIG. 8, the network device 1 may interact with a network device 2 in a neighboring cell (that is, a second cell 702) to obtain cell information such as a frequency of the second cell 702. When the terminal device 1 camps on the first cell 701, the network device 1 may send configuration information for cell reselection to the terminal device 1 based on the cell information of the neighboring cells. For example, the network device 1 may broadcast the configuration information in the form of broadcasting. The configuration information may include parameters such as a measurement object (MO), a measurement threshold, and the like.

For example, the measurement object may include parameters such as frequencies and cell identifiers of neighboring cells (for example, the second cell 702 and a third cell 703) of the first cell 701.

For example, the measurement threshold may include thresholds of one or more parameters for indicating signal quality of a cell. For example, the measurement threshold may include one or more of a received signal code power (RSCP) threshold, a reference signal received power (RSRP) threshold, a reference signal received quality (RSRQ) threshold, a signal noise ratio (SNR) threshold, a signal to interference plus noise ratio (SINR) threshold, a reference signal strength indicator (RSSI) threshold, or other signal quality thresholds.

Optionally, the measurement threshold may include a measurement threshold 1 for the serving cell (that is, the first cell 701), and may also include a measurement threshold 2 for the measurement object (that is, the neighboring cell).

Subsequently, the terminal device 1 may perform cell measurement on the measurement object in the configuration information according to the received configuration information, and perform cell measurement on the current serving cell, that is, performing the following step S602.

It should be noted that the configuration information for cell reselection may be sent by the network device to the terminal device, or the terminal device may determine the configuration information for cell reselection according to a configuration, a notification, or an indication of the network device, or the configuration information for cell reselection may be specified in a protocol, which is not limited in this embodiment of this application.

S602: The terminal device performs cell measurement according to the configuration information.

Still using the terminal device 1 obtaining the configuration information for cell reselection sent by the network device 1 as an example, the measurement object in the configuration information may include the second cell 702 of the frequency B. In addition, the configuration information may include a measurement threshold 1 for the serving cell and a measurement threshold 2 for the measurement object.

Furthermore, when the terminal device 1 is in an idle mode, signal quality of the serving cell (that is, the first cell 701) currently camped on may be measured according to the configuration information, to obtain a measurement result 1. In addition, the terminal device 1 may measure signal quality of the second cell 702 according to the configuration information, to obtain a measurement result 2. It should be noted that, in implementation of this application, the "measurement result" may also be referred to as "measurement quantity" or "measurement value", for indicating signal quality, which may be used interchangeably, or the "measurement result" may also be referred to as "signal quality".

For example, the terminal device 1 may obtain a corresponding measurement result by performing measurement on at least one of the following plurality of signals. The plurality of signals include: downlink synchronization channel, channel-state information reference signal (CSI-RS), demodulation reference signal (DMRS), cell-specific reference signal (CRS) signal, synchronization signal (SS), synchronization signal/physical broadcast channel block (SS/PBCH Block, or SSB), or other downlink signals.

It should be noted that parameter types in the measurement result of the serving cell or the neighboring cell is in one-to-one correspondence to those in the measurement threshold. For example, if the measurement threshold 1 of the serving cell includes only an RSRQ threshold, the measurement result 1 of the serving cell by the terminal device 1 correspondingly includes an RSRQ. For example, if the measurement threshold 2 of the second cell 702 includes an RSRQ threshold and an RSRP threshold, the measurement result 2 of the second cell 702 by the terminal device 1 correspondingly includes an RSRQ and an RSRP.

In addition, the measurement object in the configuration information may also include other measurement objects such as the third cell 703. In this case, the terminal device 1 may alternatively perform cell measurement on other measurement objects such as the third cell 703 by using the foregoing method, which is not limited in this embodiment of this application.

S603: When a measurement result of the second cell satisfies a cell reselection condition, the terminal device obtains a first system message from the second cell, where the first system message includes a PLMN of the second cell.

For example, it is assumed that the terminal device 1 performs cell measurement on the serving cell (that is, the first cell 701) to obtain a measurement result 1, and the terminal device 1 performs cell measurement on the second cell 702 to obtain a measurement result 2. In this case, the terminal device 1 may compare the measurement result 1 against the measurement threshold 1 in the configuration information, and the terminal device 1 may compare the measurement result 2 against the measurement threshold 2 in the configuration information.

Figure 9:
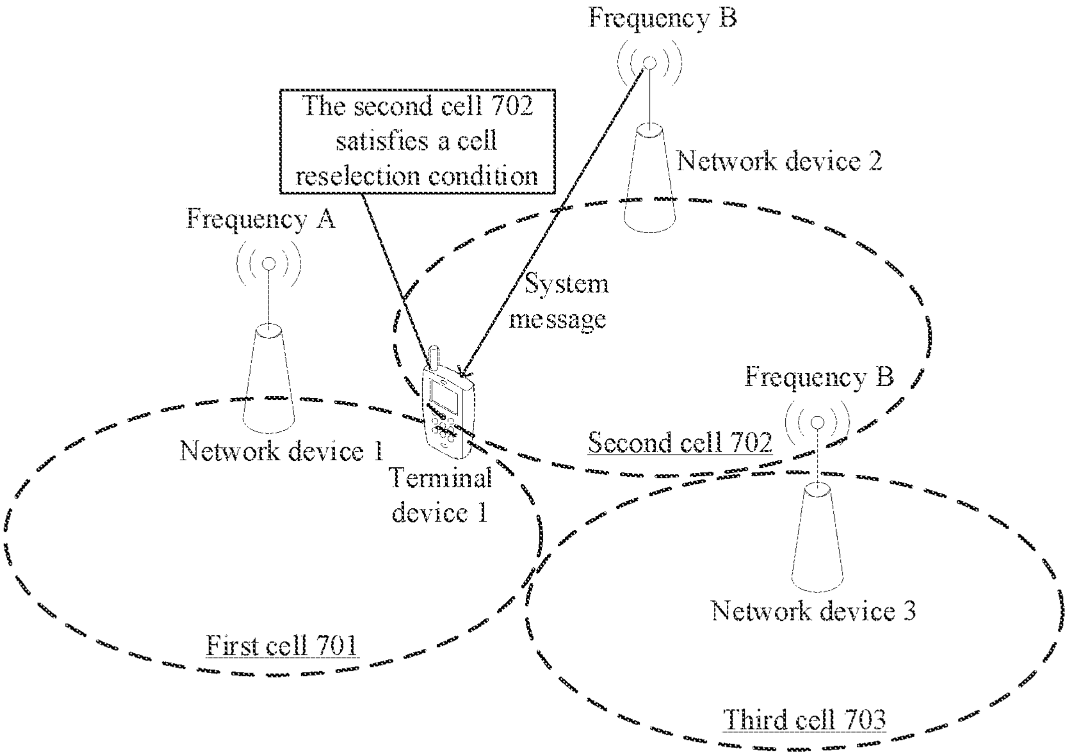
FIG. 9 is a third schematic diagram of an application scenario of a cell reselection method according to an embodiment of this application.

When the measurement result 1 is less than the measurement threshold 1 and the measurement result 2 is greater than the measurement threshold 2, as shown in FIG. 9, it indicates that signal quality of the first cell 701 received by the terminal device 1 is poorer and signal quality of the second cell 702 received by the terminal device 1 is better. In this case, the terminal device 1 may approach or enter the second cell 702.

Alternatively, the terminal device 1 may first perform cell measurement on the first cell 701. When the measurement result 1 of the first cell 701 is less than the measurement threshold 1, it indicates that the signal quality of the first cell 701 received by the terminal device 1 is relatively poor. In this case, the terminal device 1 may be triggered to perform cell measurement on the second cell 702 in the configuration information to obtain the measurement result 2. If the measurement result 2 is greater than the measurement threshold 2, it indicates that the terminal device 1 may approach or enter the second cell 702. Certainly, if the measurement result 1 of the first cell 701 is greater than the measurement threshold 1, the terminal device 1 may not perform cell measurement on the second cell 702 and remains camping on the first cell 701.

Regardless of a measurement sequence of cell measurement performed by the terminal device 1, when the measurement result 1 is less than the measurement threshold 1 and the measurement result 2 is greater than the measurement threshold 2, the terminal device 1 may determine that the second cell 702 satisfies the cell reselection condition. Alternatively, based on one or more of a priority of the frequency B of the second cell 702, a camping time of the terminal device 1 in the first cell 701, a duration of the measurement result 1 being less than the measurement threshold 1, a duration of the measurement result 2 being greater than the measurement threshold 2, or the like, the terminal device 1 may determine whether the second cell 702 satisfies the cell reselection condition.

For example, in addition to the measurement result 1 being less than the measurement threshold 1 and the measurement result 2 being greater than the measurement threshold 2, if the camping time of the terminal device 1 in the first cell 701 is longer than a preset time (for example, 1 s), the terminal device 1 may determine that the second cell 702 satisfies the cell reselection condition.

In this case, still as shown in FIG. 9, the terminal device 1 may use the second cell 702 as a candidate cell for current cell reselection (candidate for reselection), and obtain a system message sent by the network device 2 of the second cell 702. For example, the system message may include a SIB (System Information Block) message.

For example, the network device 2 of the second cell 702 may send a SIB message 1 in the form of broadcasting. After receiving the SIB message 1, the terminal device 1 may parse the SIB message 1 to obtain a PLMN of the second cell 702. If the PLMN of the second cell 702 and a PLMN of the first cell 701 are equivalent PLMNs (that is, EPLMNs), for example, both the PLMN of the second cell 702 and the PLMN of the first cell 701 are PLMNs of the operator A, indicating that the second cell 702 is also a cell of the operator A, the terminal device 1 may use the second cell 702 as a target cell for cell access through the existing cell reselection procedure.

Correspondingly, if the PLMN of the second cell 702 and the PLMN of the first cell 701 are not EPLMNs, it indicates that the terminal device 1 has no permission to access the second cell 702, and the terminal device 1 may proceed to the following step S604.

S604: If the PLMN of the second cell and the PLMN of the first cell are not equivalent PLMNs (EPLMNs), the terminal device adds a cell identifier of the second cell and a frequency of the second cell to a preset barred list.

In step S604, if the PLMN of the second cell 702 and the PLMN of the first cell 701 are not EPLMNs, the terminal device 1 may determine, based on the PLMN of the second cell 702, whether the operator B to which the second cell 702 belongs has a co-establishment relationship with the operator A to which the terminal device 1 subscribes. The co-establishment relationship means that two or more operators jointly establish a co-established cell in a cooperation manner. For example, after subscribing to the operator A, the terminal device 1 may obtain, from the network device of the operator A, operators having a co-establishment relationship, including an operator B and an operator C. Then, if the PLMN of the second cell 702 is a PLMN of the operator B, the terminal device 1 may determine that the operator B to which the second cell 702 belongs has a co-establishment relationship with the operator A to which the terminal device 1 subscribes.

When the operator B to which the second cell 702 belongs has a co-establishment relationship with the operator A to which the terminal device 1 subscribes, a frequency of the co-established cell (for example, the third cell 703) of the operator A and operator B may be the same as the frequency of the second cell 702. In this case, if the frequency B of the second cell 702 is prohibited because the PLMN of the second cell 702 and the PLMN of the first cell 701 are not EPLMNs, the third cell 703 on the same frequency cannot act as a candidate cell to participate in the cell reselection procedure of the terminal device 1.

In this regard, in step S604, when the PLMN of the second cell 702 and the PLMN of the first cell 701 are not EPLMNs, and the operator B to which the second cell 702 belongs has a co-establishment relationship with the operator A to which the terminal device 1 subscribes, the terminal device 1 may add the cell identifier of the second cell 702 and the frequency B of the second cell 702 to the preset barred list 1, instead of directly adding the frequency B of the second cell 702 to the preset barred list 1.

For example, the terminal device 1 may configure a barred list 1 for the cell reselection procedure in advance. For example, an initial state of the barred list 1 may be blank, that is, all cells satisfying the foregoing cell reselection condition may act as candidate cells to participate in the cell reselection procedure of the terminal device 1. After the terminal device 1 performs the cell measurement and determines that the second cell 702 satisfies the cell reselection condition, if the PLMN of the second cell 702 and the PLMN of the first cell 701 are not EPLMNs, and the operator B to which the second cell 702 belongs has a co-establishment relationship with the operator A to which the terminal device 1 subscribes, as shown in Table 1, the terminal device 1 may add the cell ID (that is, the cell identifier) of the second cell 702 and the frequency B of the second cell 702 to the barred list 1. In this way, the terminal device 1 configures the barred list 1 for cell reselection based on a cell granularity, instead of configuring the barred list 1 for cell reselection based on a frequency granularity, so that subsequently a co-established cell on the same frequency as the second cell 702 can still act as a candidate cell to participate in the cell reselection procedure of the terminal device 1.

TABLE 1

| Cell identifier | Frequency | Forbidden duration |
|---|---|---|
| Cell ID of the second cell 702 | Frequency B | 300 seconds |
| . . . | . . . | . . . |

Optionally, in the barred list 1, a corresponding forbidden duration can be also set. For example, after adding the cell ID of the second cell 702 and the frequency B to the barred list 1, the terminal device 1 may start a timer 1 with a duration of 300 seconds. In the period of time before the timer 1 expires, because the second cell 702 is included in the barred list 1, even if the second cell 702 satisfies the cell reselection condition, the second cell 702 cannot act as a candidate cell to participate in the cell reselection procedure of the terminal device 1. For example, after the terminal device 1 detects a signal of the second cell 702, the signal may be ignored (for example, being discarded), so that the second cell 702 cannot act as a candidate cell to participate in the cell reselection procedure of the terminal device 1.

After the timer 1 expires, the terminal device 1 may delete information such as the cell ID of the second cell 702 and the frequency B from the barred list 1 shown in Table 1. In this way, the second cell 702 may act as a candidate cell again to participate in the cell reselection procedure of the terminal device 1.

In some other embodiments, when the PLMN of the second cell 702 and the PLMN of the first cell 701 are not EPLMNs, and the operator B to which the second cell 702 belongs has a co-establishment relationship with the operator A to which the terminal device 1 subscribes, the terminal device 1 may also determine, based on one or more conditions of a moving state of the terminal device 1, a power level of the terminal device 1, a screen use status of the terminal device 1, or signal quality of the serving cell (that is, the first cell 701) of the terminal device 1, whether to add the second cell 702 to the barred list 1.

Figure 10:
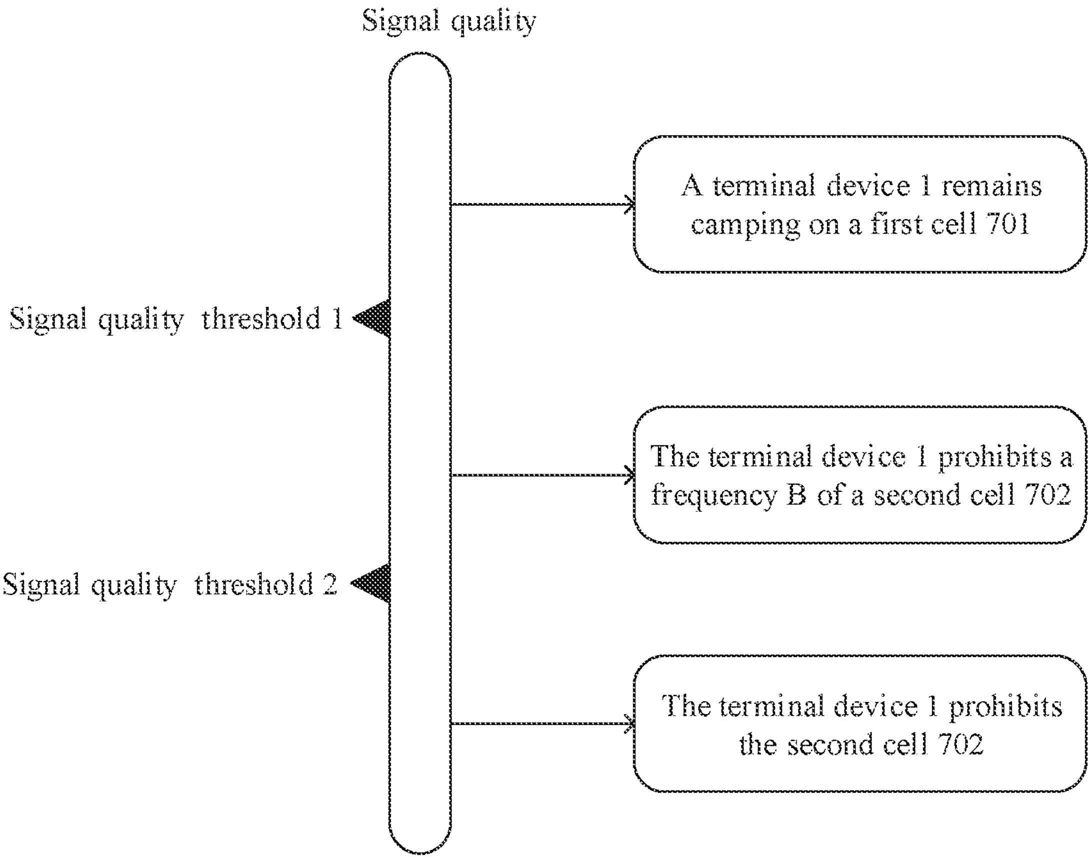
FIG. 10 is a fourth schematic diagram of an application scenario of a cell reselection method according to an embodiment of this application.

For example, as shown in FIG. 10, if the signal quality of the first cell 701 is greater than the signal quality threshold 1, indicating that the first cell 701 is currently able to provide signal services with higher quality for the terminal device 1, the terminal device 1 may remain camping on the first cell 701, and does not trigger the cell reselection procedure. If the signal quality of the first cell 701 is less than the signal quality threshold 2 (the signal quality threshold 2 is less than or equal to the signal quality threshold 1), indicating that the first cell 701 can no longer provide signal services with higher quality for the terminal device 1, the terminal device 1 may add the second cell 702 to the barred list 1, so that the terminal device 1 can access a cell with higher signal quality through the cell reselection procedure as soon as possible. Correspondingly, if the signal quality of the first cell 701 is between the signal quality threshold 1 and the signal quality threshold 2, the terminal device 1 can still use the existing technology to add the frequency B of the second cell 702 to the barred list 1.

Figure 11:
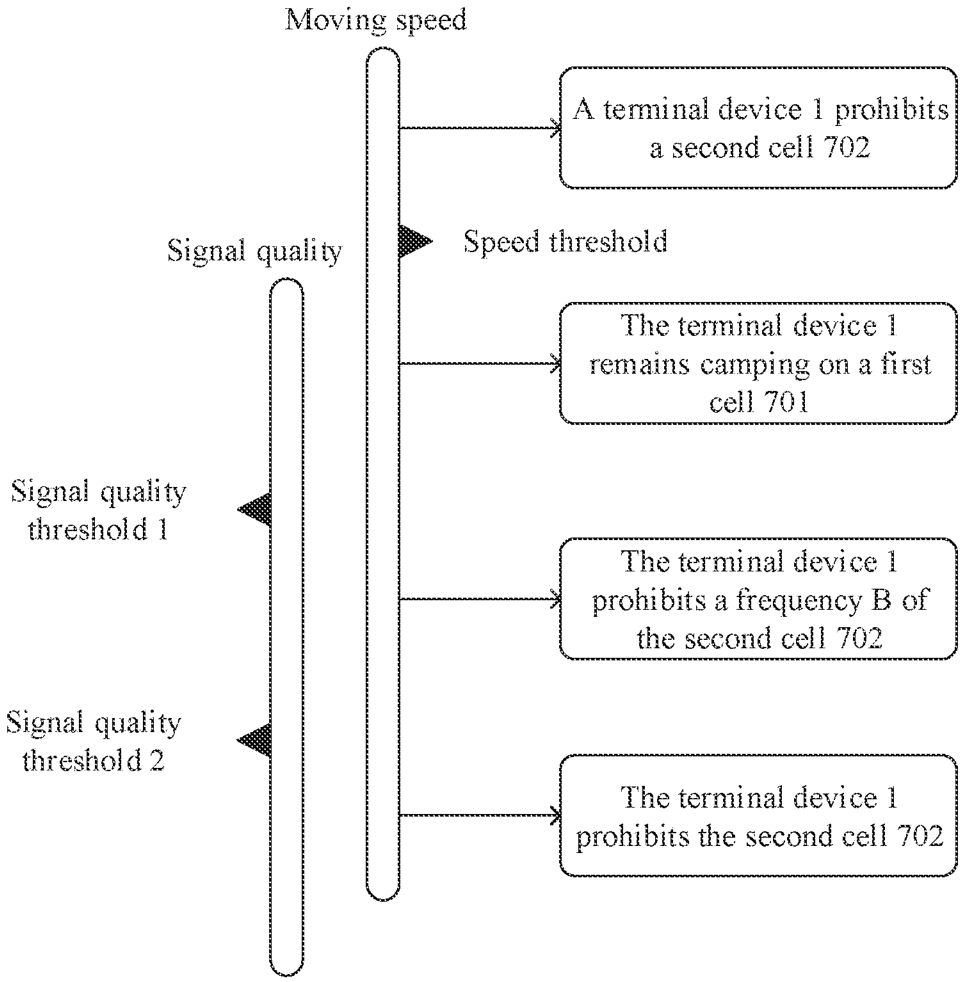
FIG. 11 is a fifth schematic diagram of an application scenario of a cell reselection method according to an embodiment of this application.

For example, as shown in FIG. 11, if the terminal device 1 is in a relatively fast moving state, for example, the moving speed of the terminal device 1 is greater than a speed threshold, the terminal device 1 may add the second cell 702 to the barred list 1, so that the terminal device 1 can access a cell with higher signal quality through the cell reselection procedure as soon as possible, guaranteeing mobility performance of the terminal device 1.

If the terminal device 1 is in a relatively slow moving state, for example, when the moving speed of the terminal device 1 is less than the speed threshold or close to 0, the terminal device 1 may also determine, based on the signal quality of the first cell 701, whether to add the second cell 702 to the barred list 1. For example, as shown in FIG. 11, when the terminal device 1 is in a relatively slow moving state, if the signal quality of the first cell 701 is greater than the signal quality threshold 1, the terminal device 1 may remain camping on the first cell 701, and does not trigger the cell reselection procedure; if the signal quality of the first cell 701 is less than the signal quality threshold 2, the terminal device 1 may add the second cell 702 to the barred list 1; or if the signal quality of the first cell 701 is between the signal quality threshold 1 and the signal quality threshold 2, the terminal device 1 can still use the existing technology to add the frequency B of the second cell 702 to the barred list 1.

Figure 12:
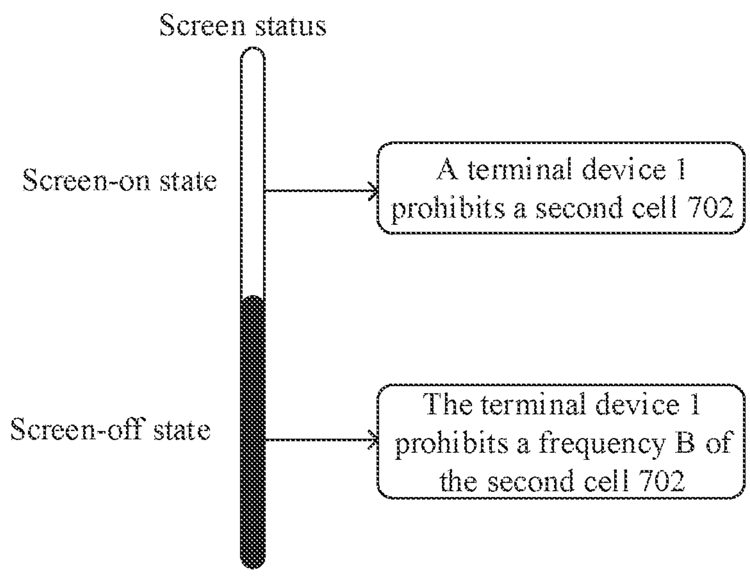
FIG. 12 is a sixth schematic diagram of an application scenario of a cell reselection method according to an embodiment of this application.

For example, as shown in FIG. 12, if a display of the terminal device 1 is in a screen-on state, indicating that the user is possibly using the terminal device 1, the terminal device 1 may add the second cell 702 to the barred list 1, so that the terminal device 1 can access a cell with higher signal quality through the cell reselection procedure as soon as possible, guaranteeing mobility performance of the terminal device 1. If the display of the terminal device 1 is in a screen-off (or black screen) state, indicating that the user does not need to use the terminal device 1 currently, the terminal device 1 can still use the existing technology to add the frequency B of the second cell 702 to the barred list 1, thereby reducing power consumption for the cell reselection procedure.

Figure 13:
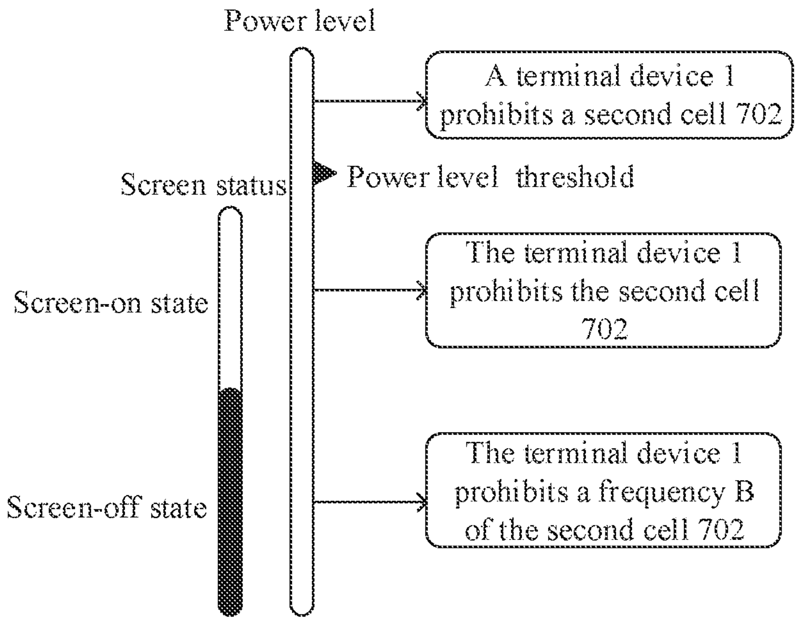
FIG. 13 is a seventh schematic diagram of an application scenario of a cell reselection method according to an embodiment of this application.

For example, as shown in FIG. 13, if the power level of the terminal device 1 is greater than a power level threshold, indicating that the terminal device 1 has relatively sufficient power, the terminal device 1 may add the second cell 702 to the barred list 1, thereby controlling cells based on a smaller granularity to participate in cell reselection of the terminal device 1.

If the power level of the terminal device 1 is less than the power level threshold, the terminal device 1 may further determine, based on the screen status of the terminal device, whether to add the second cell 702 to the barred list 1. For example, as shown in FIG. 13, when the power level of the terminal device 1 is less than the power level threshold, if the display of the terminal device 1 is in a screen-on state, the terminal device 1 may add the second cell 702 to the barred list 1, so that the terminal device 1 can access a cell with higher signal quality through the cell reselection procedure as soon as possible; if the display of the terminal device 1 is in a screen-off (or black screen) state, the terminal device 1 can still use the existing technology to add the frequency B of the second cell 702 to the barred list 1, thereby reducing power consumption for the cell reselection procedure.

It can be understood that under the conditions that the PLMN of the second cell 702 and the PLMN of the first cell 701 are not EPLMNs and the operator B to which the second cell 702 belongs has a co-establishment relationship with the operator A to which the terminal device 1 subscribes, those skilled in the art may alternatively set other trigger conditions based on actual experience or actual application scenarios to add the second cell 702 to the barred list 1, which is not limited in this embodiment of this application.

S605: When a measurement result of the third cell satisfies the cell reselection condition, the terminal device obtains a second system message from the third cell, where the second system message includes a PLMN of the third cell, and a frequency of the third cell is the same as the frequency of the second cell.

For example, before the terminal device 1 accesses a new cell, the terminal device 1 in the idle mode continuously obtains latest configuration information by performing step S601, and performs cell measurement by performing step S602. After the terminal device 1 adds the second cell 702 to the barred list 1, a measurement object in the latest configuration information may include the third cell 703 of the frequency B, where the third cell 703 may be a co-established cell of the operator A and the operator B, and the frequency of the third cell 703 may be the same as the frequency of the second cell 702, both being the frequency B. Correspondingly, if the measurement object includes the third cell 703, the latest configuration information may further include a measurement threshold 3 corresponding to the third cell 703.

In this case, the terminal device 1 may query, based on a cell identifier of the third cell 703, whether the third cell 703 is included in the barred list 1 shown in Table 1. If the third cell 703 is not included in the barred list 1, the terminal device 1 may perform cell measurement on the third cell 703 by using the related method in step S602 to obtain a measurement result 3; and the terminal device 1 may also perform cell measurement on the first cell 701 at the same time, to obtain a latest measurement result 1 of the first cell 701. In this way, although the frequency of the third cell 703 is the same as the frequency of the second cell 702, both being the frequency B, the terminal device 1 can perform cell measurement on the third cell 703 because the terminal device 1 prohibits the second cell 702 based on the cell granularity in step S604, instead of prohibiting the frequency B. If the third cell 703 satisfies the cell reselection condition, the third cell 703 may act as a candidate cell to participate in the cell reselection procedure of the terminal device 1.

Figure 14:
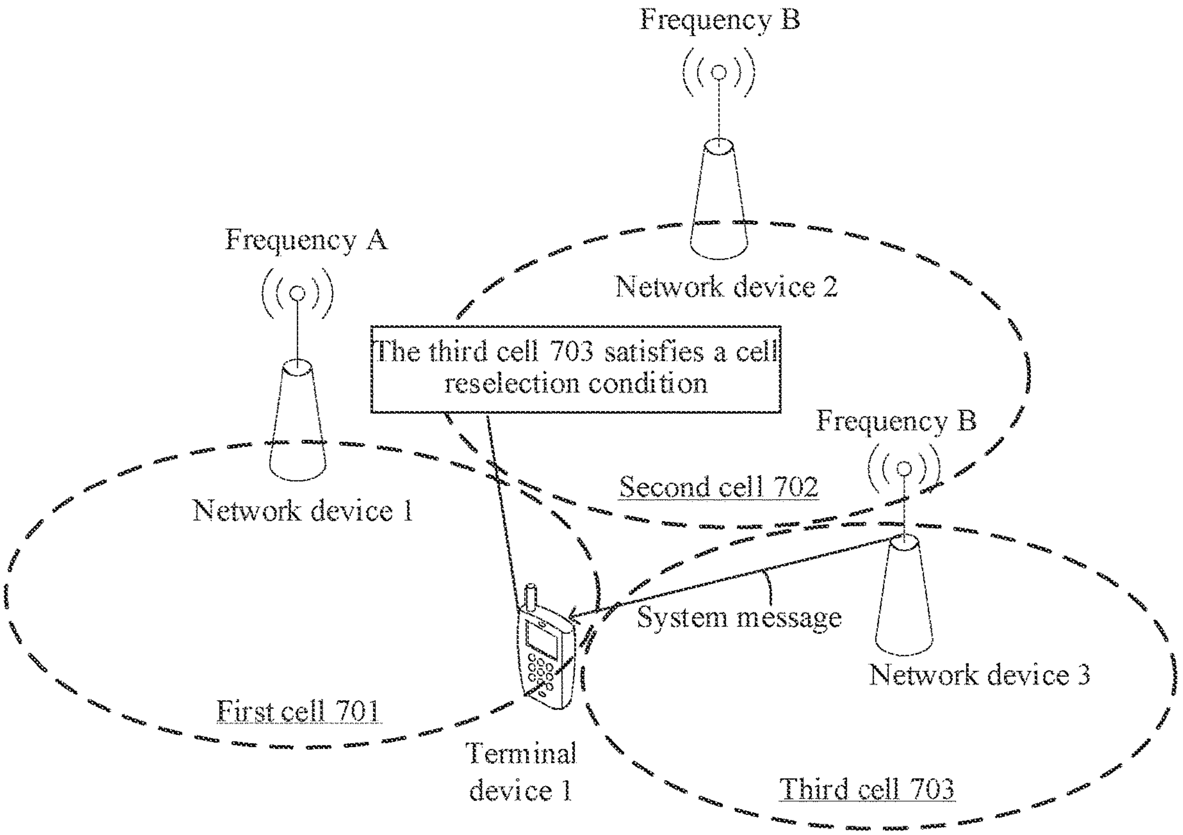
FIG. 14 is an eighth schematic diagram of an application scenario of a cell reselection method according to an embodiment of this application.

If the latest measurement result 1 of the first cell 701 is less than the measurement threshold 1 and the measurement result 3 is greater than the measurement threshold 3, indicating that the signal quality of the first cell 701 currently received by the terminal device 1 is poorer and the signal quality of the third cell 703 currently received by the terminal device 1 is better, as shown in FIG. 14, the terminal device 1 may approach or enter the third cell 703 at that time. In this case, the terminal device 1 may determine that the measurement result of the third cell 703 satisfies the cell reselection condition. Further, the terminal device 1 may use the third cell 703 as a candidate cell for the current cell reselection, and obtain a system message sent by a network device 3 of the third cell 703, for example, obtaining a SIB message 2 broadcast by the network device 3.

S606: If the PLMN of the third cell and the PLMN of the first cell are equivalent PLMNs, the terminal device uses the third cell as a target cell to camp on.

For example, after obtaining the SIB message 2 broadcast by the network device 3, the terminal device 1 may obtain the PLMN of the third cell 703 by parsing the SIB message 2. When the third cell 703 is a co-established cell of the operator A and the operator B, the PLMN of the third cell 703 includes two PLMNs: the PLMN of the first cell 701 and the PLMN of the second cell 702. The terminal device 1 may determine whether two PLMNs are EPLMNs with the PLMN of the first cell 701. When one PLMN of the third cell 703 and the PLMN of the first cell 701 are EPLMNs, it may be considered that the PLMN of the third cell 703 and the PLMN of the first cell are EPLMNs. In this case, the terminal device 1 may use the third cell 703 as the target cell to access through the normal cell reselection procedure, so that the terminal device 1 moves from the first cell 701 to the third cell 703 to camp on.

It can be learned that although the frequencies of the third cell 703 (that is, the co-established cell) and the second cell 702 are the same, because the terminal device 1 can configure the barred list for cell reselection based on the cell granularity, a cell reselection procedure for the third cell 703 with the same frequency is not affected when the terminal device 1 prohibits the second cell 702, so that the terminal device 1 can successfully access another cell on the same frequency as a forbidden cell through the cell reselection procedure in a scenario with both a co-established cell and a non-co-established cell, so as to obtain service signals with better signal quality, improving mobility performance of the terminal device 1.

The foregoing embodiment provides description by using an example where during cell reselection, the terminal device 1 first determines, through cell measurement in the cell reselection procedure, a candidate cell (for example, the second cell 702 or the third cell 703) that satisfies a reselection condition, and then obtains a system message of the candidate cell to parse out the PLMN of the candidate cell.

In some embodiments, the terminal device 1 may alternatively obtain a system message of a neighboring cell to parse out a PLMN of the neighboring cell, when no cell reselection procedure is initiated. For example, after detecting the SIB message of the second cell 702, the terminal device 1 may parse the SIB message of the second cell 702 to obtain the PLMN of the second cell 702. If the PLMN of the second cell 702 and the PLMN of the serving cell (that is, the first cell 701) are not EPLMNs, and the operator to which the second cell 702 belongs has a co-establishment relationship with the operator to which the terminal device 1 subscribes, when the terminal device 1 subsequently detects, during cell reselection, that the second cell 702 satisfies the reselection condition, the terminal device 1 may add the second cell 702 to the barred list in this case.

In some other embodiments, after the terminal device 1 detects the SIB message of the second cell 702, if the PLMN of the second cell 702 and the PLMN of the serving cell (that is, the first cell 701) are not EPLMNs, and the operator to which the second cell 702 belongs has a co-establishment relationship with the operator to which the terminal device 1 subscribes, the terminal device 1 may directly add the second cell 702 to the barred list. In this way, after the terminal device 1 initiates the cell reselection procedure subsequently, the second cell 702 in the barred list cannot participate in the cell reselection procedure of the terminal device 1. However, because the third cell 703 on the same frequency as the second cell 702 is not included in the barred list, the third cell 703 can normally participate in the cell reselection procedure of the terminal device 1. If the third cell 703 satisfies the reselection condition, the terminal device 1 may access the third cell 703.

It should be noted that the first cell 701, the second cell 702, and the third cell 703 in the foregoing embodiment may be cells covering the 4G network (which may be referred to as 4G cells), or may be cells covering the 5G network (which may be referred to as 5G cells), or may be cells using other communications technologies. The terminal device 1 may determine, based on frequencies of cells, that a corresponding cell is a 4G cell, a 5G cell, or a cell using other communications technologies.

5G cells may include standalone (SA) 5G cells (also referred to as SA cells) and non-standalone (NSA) 5G cells (also referred to as NSA cells). In 5G cells established by the same operator or established by operators in a co-establishment relationship, the NSA cell and the SA cell may have a same frequency.

Figure 15:
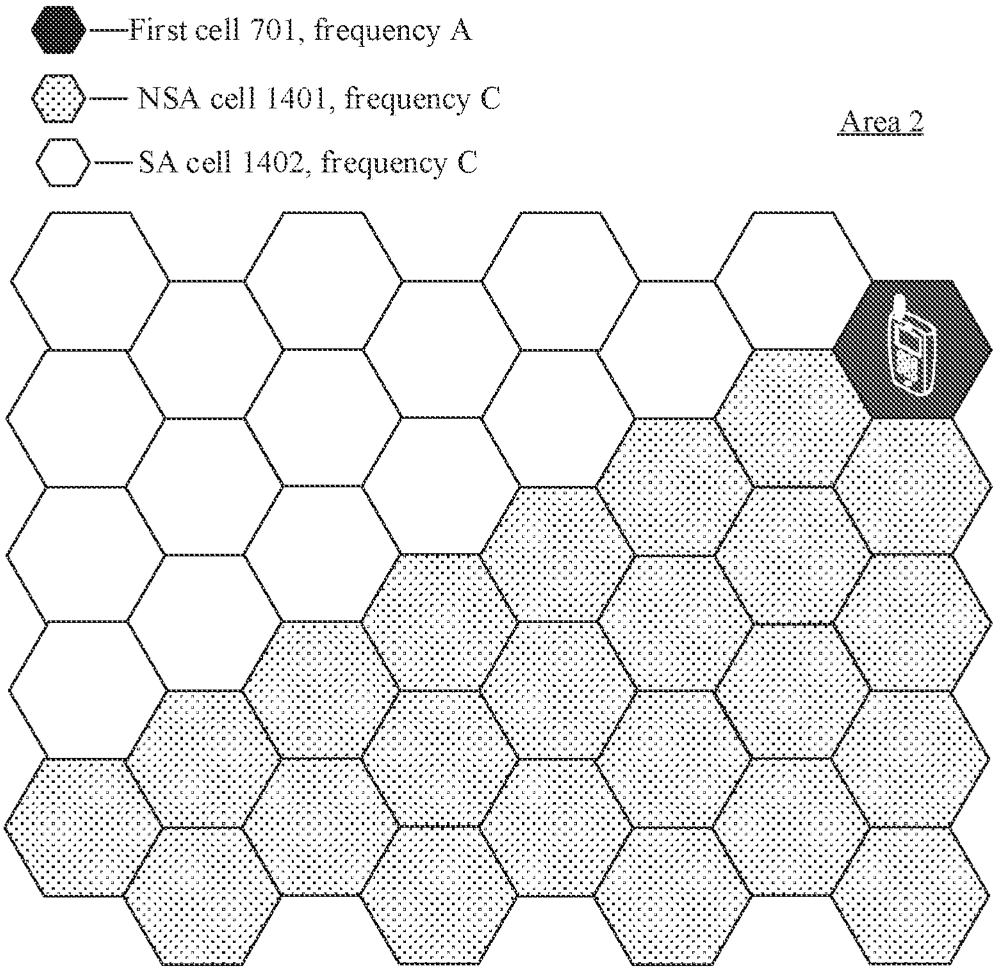
FIG. 15 is a ninth schematic diagram of an application scenario of a cell reselection method according to an embodiment of this application.

For example, as shown in FIG. 15, a plurality of 5G co-established cells jointly established by the operator A and the operator B are included in an area 2. The 5G co-established cells include an NSA cell 1401 and an SA cell 1402, and frequencies of the NSA cell 1401 and the SA cell 1402 are both frequency C. In addition, the area 2 may further include the first cell 701 established by the operator A, the first cell 701 may be a 4G cell or a 5G cell, and the frequency of the first cell 701 is still the frequency A.

At present, as specified by section 38.304 5.3.1 of the 3GPP protocol, if intra-frequency cell reselection not allowed for the terminal device is configured in a MIB (Master Information Block) message of the NSA cell, the terminal device needs to prohibit a frequency of the current NSA cell for 300 seconds in the cell selection and reselection procedures. In other words, within 300 seconds, the terminal device cannot use a cell on the same frequency as the NSA cell as a target cell for cell reselection or cell selection (cell selection/reselection), thereby reducing power consumption of the terminal device.

Related regulations in section 38.304 5.3.1 of the 3GPP protocol are as follows:

If the field intraFreqReselection in MIB message is set to "not allowed" the UE shall not re-select a cell on the same frequency as the barred cell; the UE shall exclude the barred cell and the cells on the same frequency as a candidate for cell selection/reselection for 300 seconds.

In this scenario, as shown in FIG. 15, after the terminal device 1 subscribed to the operator A camps on the first cell 701 of the frequency A, if detecting that an NSA cell 1401 satisfies the cell reselection condition, the terminal device 1 may further parse a MIB message of the NSA cell 1401. In this case, if intra-frequency cell reselection not allowed for the terminal device is configured in the MIB message, the terminal device 1 needs to prohibit a frequency C of the NSA cell 1401 according to the regulations of the foregoing protocol. Similar to the scenario in the foregoing embodiment, after the terminal device 1 prohibits the frequency C, an SA cell 1402 on the same frequency as the NSA cell 1401 cannot act as a candidate cell to participate in the cell selection and cell reselection procedures of the terminal device 1, thereby affecting signal quality obtained by the terminal device 1 and mobility performance.

In this regard, similar to the foregoing embodiment, after the terminal device 1 detects that the NSA cell 1401 satisfies the cell reselection condition, if it is determined, through parsing of the MIB message of the NSA cell 1401, that intra-frequency cell reselection is not allowed for the terminal device, the terminal device 1 may add the NSA cell 1401 to a preset barred list 2, instead of adding the frequency C of the NSA cell 1401 to the barred list 2.

Different from the barred list 1 in the foregoing embodiment, the barred list 2 is not only applicable to the subsequent cell reselection procedure, but also applicable to the subsequent cell selection procedure. In this way, the terminal device 1 configures the barred list 1 for cell reselection based on a cell granularity, instead of configuring the barred list 1 for cell reselection (or cell selection) based on a frequency granularity, so that subsequently an SA cell on the same frequency as the second NSA cell 1401 can still act as a candidate cell to participate in the cell reselection (or cell selection) procedure of the terminal device 1.

For example, the terminal device can still execute the corresponding method according to the steps S601 to S606 in the foregoing embodiment. In this case, the second cell 702 may be an NSA cell jointly established by the operator A and the operator B, the third cell 703 may be an SA cell jointly established by the operator A and the operator B, and the frequency of the second cell 702 is still the same as the frequency of the third cell 703. Certainly, the second cell 702 and the third cell 703 may alternatively be non-co-established cells on the same frequency, which is not limited in this embodiment of this application.

Figure 16:
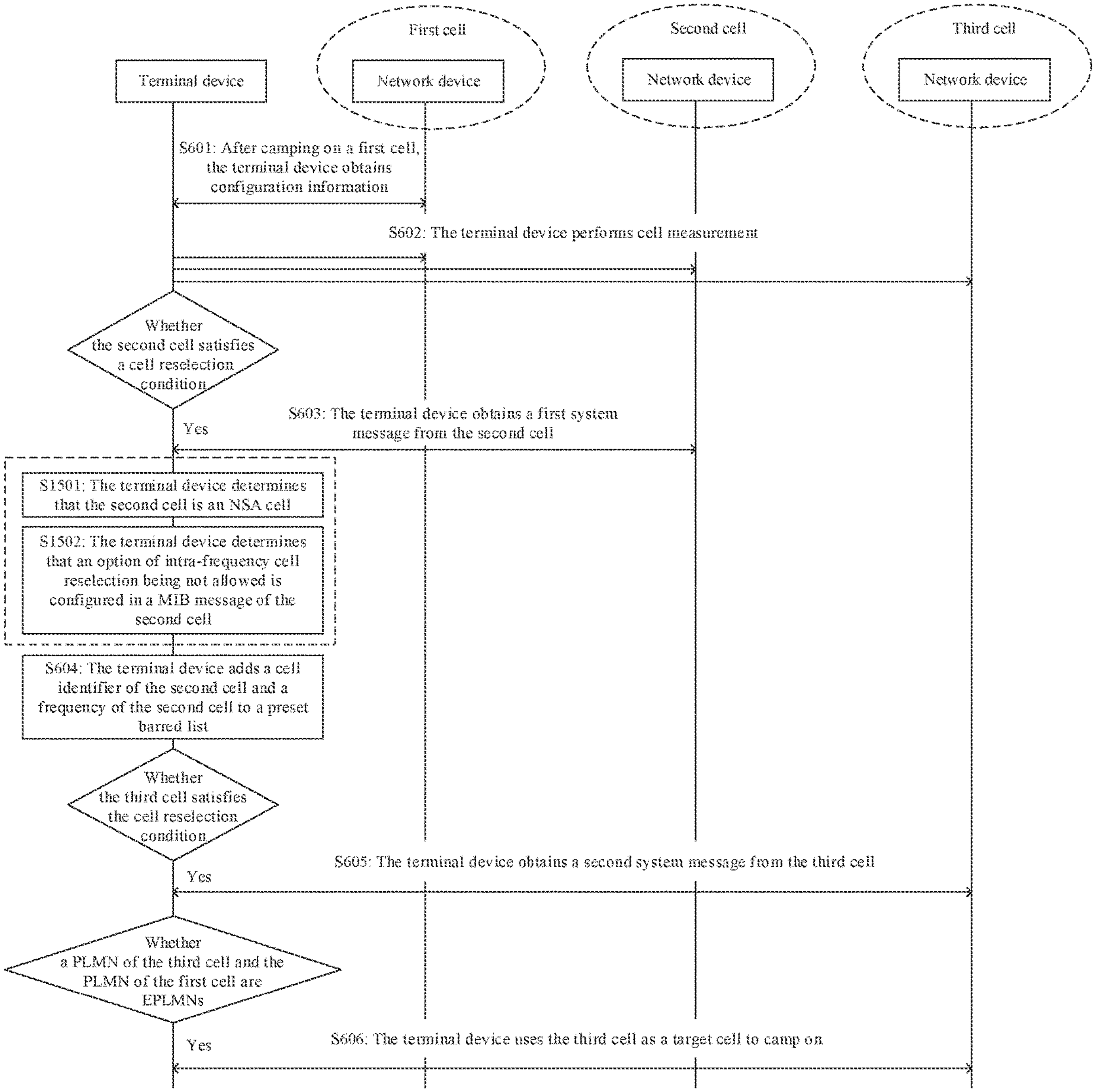
FIG. 16 is a second schematic diagram of interaction of a cell reselection method according to an embodiment of this application.

Different from the steps S601 to S606 in the foregoing embodiment, when performing cell measurement on the second cell 702, the terminal device 1 may determine, based on the frequency B of the second cell 702, that the second cell 702 is a 5G cell. In this case, as shown in FIG. 16, by performing step S603, the terminal device 1 may obtain a first system message of the second cell 702, for example, a SIB message 1. Further, the terminal device 1 may further perform the following steps S1501 and S1502 before performing step S604:

S1501: The terminal device 1 determines that the second cell 702 is an NSA cell.

For example, after obtaining the SIB message 1 of the second cell 702, the terminal device 1 may parse the SIB message 1 to determine whether a TAC (tracking area code) corresponding to the PLMN of the second cell 702 is carried. If there is no TAC corresponding to the PLMN of the second cell 702, the terminal device 1 may determine that the second cell 702 is an NSA cell in the 5G cells; otherwise, the terminal device 1 may determine that the second cell 702 is an SA cell in the 5G cells.

S1502: The terminal device 1 determines that an option of intra-frequency cell reselection not allowed is configured in a MIB message of the second cell 702.

For example, the system message obtained by the terminal device 1 from the second cell 702 may include a SIB message, and may also include a MIB message. After the terminal device 1 determines that the second cell 702 is an NSA cell, the terminal device 1 may parse the MIB message of the second cell 702 and determine whether the option of intra-frequency cell reselection not allowed is configured in the MIB message. If the option of intra-frequency cell reselection in the MIB message is set to "not allowed" (that is, not allowed), the terminal device 1 may determine that the option of intra-frequency cell reselection not allowed is configured in the MIB message.

Further, the terminal device 1 may perform related steps in step S604, that is, adding the cell identifier of the second cell 702 and the frequency of the second cell to the preset barred list. In this case, the barred list may be a barred list 2, and the barred list 2 is not only applicable to the subsequent cell reselection procedure, but also applicable to the subsequent cell selection procedure.

Alternatively, the barred list 1 may be configured for use in the subsequent cell reselection procedure, and the barred list 2 may be configured for use in the subsequent cell selection procedure. In this case, the terminal device 1 may add the cell identifier of the second cell 702 and the frequency of the second cell to the barred list 1 and the barred list 2. For the specific method for adding the second cell 702 to the barred list 1 (or the barred list 2) by the terminal device 1, refer to the related description of the foregoing step S604. Details are not repeated herein.

That is, after the terminal device 1 determines that the second cell 702 is an NSA cell in the 5G cells, a trigger condition for prohibiting the second cell 702 by the terminal device 1 changes from the PLMN of the second cell 702 and the PLMN of the first cell 701 being not EPLMNs in S604 to the option of intra-frequency cell reselection not allowed being configured in the MIB message of the second cell 702 in S1502.

In this way, when the terminal device 1 subsequently detects that the SA cell (that is, the third cell 703) on the same frequency as the second cell 702 satisfies the cell reselection condition (or cell selection condition), the terminal device 1 can still use the normal cell reselection procedure (or cell selection procedure) to access the third cell 703, so that the terminal device 1 can successfully access an SA cell on the same frequency as a forbidden NSA cell through the cell reselection procedure (or cell selection procedure) when the terminal device 1 moves between the SA cell and the NSA cell on the same frequency, so as to obtain service signals with better signal quality, improving mobility performance of the terminal device 1.

Correspondingly, when the terminal device 1 subsequently detects that the NSA cell on the same frequency as the second cell 702 satisfies the cell reselection condition (or cell selection condition), the terminal device 1 can continue to determine, based on the MIB message to the NSA cell, whether to add the NSA cell to the barred list 2. Alternatively, when the terminal device 1 subsequently detects that a 4G cell on the same frequency as the second cell 702 satisfies the cell reselection condition, the terminal device 1 may jump to step S603 in the foregoing embodiment, and execute the cell reselection method according to steps S603 to S606.

It can be understood that, in the embodiments of this application, the terminal device and/or the network device may perform some or all of the steps in the embodiments of this application, these steps or operations are only examples, and other operations or variations of various operations may be further performed in the embodiments of this application. In addition, the steps may be performed in an order different from that described in the embodiments of this application, and possibly not all of the operations in the embodiments of this application need to be performed.

It should be noted that names of messages between the network elements or names of parameters in the messages in the foregoing embodiments of this application are merely examples, or other names may be used in specific implementation, which is not specifically limited in the embodiments of this application.

Figure 17:
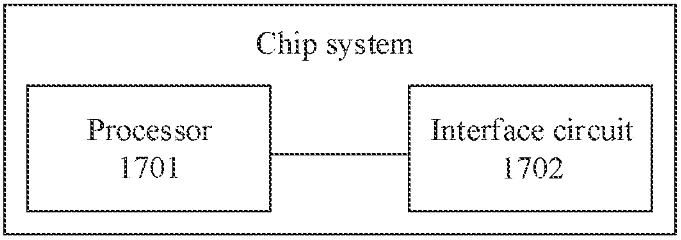
FIG. 17 is a schematic architectural diagram of a chip system according to an embodiment of this application.

An embodiment of this application discloses a chip system. As shown in FIG. 17, the chip system includes at least one processor 1701 and at least one interface circuit 1702. The processor 1701 and the interface circuit 1702 may be interconnected by a line. For example, the interface circuit 1702 may be configured to receive signals from other apparatuses (for example, a memory). For another example, the interface circuit 1702 may be configured to send signals to other apparatuses (for example, the processor 1701). For example, the interface circuit 1702 may read an instruction stored in the memory and send the instruction to the processor 1701. When the instruction is executed by the processor 1701, the terminal device performs the steps in the foregoing embodiments. Certainly, the chip system may further include other discrete devices, and this is not specifically limited in this embodiment of this application.

For example, the system-on-chip may be a system-on-chip including a baseband (base band) circuit, or a system-on-chip including a radio frequency circuit. The chip system may be disposed in a modem or other components of a terminal device, which is not limited in this embodiment of this application.

An embodiment of this application discloses a terminal device, including a processor, a memory connected to the processor, a communications device, and the like. The terminal device may further include an input device and an output device. The input device and the output device may be integrated into one device, for example, a touch-sensitive surface may be used as the input device and a display as the output device, and then the touch-sensitive surface and the display may be integrated into a touchscreen.

Figure 18:
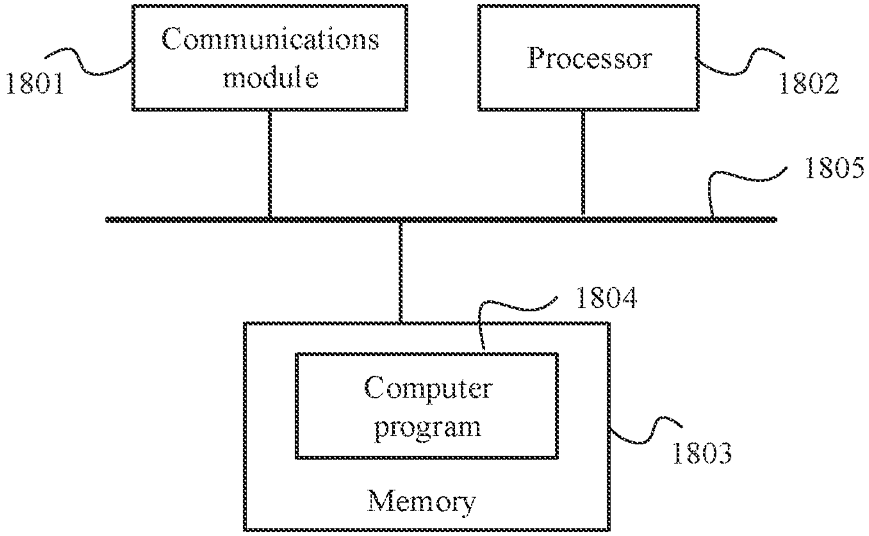
FIG. 18 is a third schematic structural diagram of a terminal device according to an embodiment of this application.

For example, as shown in FIG. 18, the terminal device may include: a communications module 1801, one or more processors 1802, a memory 1803; one or more application programs (not shown), and one or more computer programs 1804, where the components may be connected through one or more communications buses 1805. The one or more computer programs 1804 are stored in the memory 1803 and configured to be executed by the one or more processors 1802. The one or more computer programs 1804 include instructions, and the instructions may be used to execute the steps in the foregoing embodiments. Certainly, the terminal device may further include parts such as a touch-sensitive surface and a display, which is not limited in this embodiment of this application. All related content of the steps in the foregoing method embodiments may be cited in functional descriptions of corresponding physical components, and details are not described herein again.

For example, the processor 1802 may be the processor 110 shown in FIG. 6, the memory 1803 may be the internal memory 121 shown in FIG. 6, and the communications module 1801 may be the mobile communications module 150 or the wireless communications module 160 shown in FIG. 6, which is not limited in this embodiment of this application.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in the present application, it should be understood that the disclosed apparatus and method may be implemented in other manners. For example, the described apparatus embodiment is only illustrative. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Units described as separate components may or may not be physically separate. A component displayed as a unit may be one or more physical units, and may be located in one place, or may be distributed in a plurality of places. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

If the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium, and includes several instructions for instructing a device (which may be a single-chip microcomputer, a chip, or the like) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A cell reselection method, comprising:

camping, by a terminal device, on a first cell, wherein the first cell corresponds to a first frequency, and in the first cell, the first frequency corresponds to a first public land mobile network (PLMN);

based on the terminal device detecting that a second cell satisfies a cell reselection condition and a second PLMN of the second cell and the first PLMN are not equivalent public land mobile networks (EPLMNs), skipping, by the terminal device, performing an action of reselection to the second cell, and prohibiting the second cell for a forbidden duration, wherein the second cell is a neighboring cell of the first cell, the second cell corresponds to a second frequency, the second frequency is different from the first frequency, and in the second cell, the second frequency corresponds to the second PLMN; and based on the terminal device detecting that a third cell satisfies the cell reselection condition and a third PLMN of the third cell and the first PLMN are EPLMNs, performing, by the terminal device, an action of reselection to the third cell, wherein the third cell is a neighboring cell of the first cell, the third cell corresponds to the second frequency, and in the third cell, the second frequency corresponds to the third PLMN and the third PLMN comprises the first PLMN and the second PLMN.

2. The method according to claim 1, wherein after the camping, by the terminal device, on the first cell, the method further comprises:

performing, by the terminal device, cell measurement on at least one neighboring cell of the first cell; and based on a measurement result of the second cell satisfying the cell reselection condition, obtaining, by the terminal device, the second PLMN of the second cell.

3. The method according to claim 2, wherein the obtaining, by the terminal device, the second PLMN of the second cell comprises:

obtaining, by the terminal device, a system information block (SIB) message of the second cell; and parsing, by the terminal device, the SIB message of the second cell to obtain the second PLMN of the second cell.

4. The method according to claim 2, wherein the performing, by the terminal device, the cell measurement on the at least one neighboring cell of the first cell comprises:

obtaining, by the terminal device, configuration information from a network device of the first cell, wherein the configuration information comprises at least one measurement object and a measurement threshold; and performing, by the terminal device, the cell measurement according to the configuration information.

5. The method according to claim 1, wherein the prohibiting the second cell for the forbidden duration comprises:

adding, by the terminal device, the second cell to a barred list and starting a timer with a duration of 300 seconds.

6. The method according to claim 1, wherein based on the terminal device detecting that the second cell satisfies the cell reselection condition, and the second PLMN of the second cell and the first PLMN are not EPLMNs, the method further comprises:

obtaining, by the terminal device, at least one parameter, wherein the at least one parameter comprises a moving speed of the terminal device, a screen status of the terminal device, a power level of the terminal device, or a signal quality of the first cell;

wherein the prohibiting the second cell for the forbidden duration comprises:

based on the signal quality of the first cell being less than a preset signal quality threshold, prohibiting the second cell for the forbidden duration; and/or based on the moving speed of the terminal device being greater than a preset speed threshold, prohibiting the second cell for the forbidden duration; and/or based on the screen status of the terminal device being a screen-on state, prohibiting the second cell for the forbidden duration; and/or based on the power level of the terminal device being greater than a preset power level threshold, prohibiting the second cell for the forbidden duration.

7. The method according to claim 1, wherein based on the terminal device detecting that the second cell satisfies the cell reselection condition and the second PLMN of the second cell and the first PLMN are not EPLMNs, the method further comprises:

determining, by the terminal device, that a first operator to which the first cell belongs has a co-establishment relationship with a second operator to which the second cell belongs.

8. The method according to claim 1, after the prohibiting the second cell for the forbidden duration, the method further comprises:

after detecting a signal of the second cell, discarding, by the terminal device, the signal of the second cell.

9. The method according to claim 1, wherein the terminal device detecting that the second cell satisfies the cell reselection condition comprises:

based on a measurement result of the second cell being greater than a first threshold and a measurement result of the first cell being less than a second threshold, determining, by the terminal device, that the second cell satisfies the cell reselection condition; and wherein the terminal device detecting that the third cell satisfies the cell reselection condition comprises:

based on a measurement result of the third cell being greater than the first threshold and the measurement result of the first cell being less than the second threshold, determining, by the terminal device, that the third cell satisfies the cell reselection condition.

10. The method according to claim 1, wherein after the terminal device detects that the third cell satisfies the cell reselection condition, the method further comprises:

obtaining, by the terminal device, the third PLMN of the third cell; and based on one PLMN in the third PLMN and the first PLMN are EPLMNs, determining, by the terminal device, that the third PLMN and the first PLMN are EPLMNs.

11. A cell reselection method, comprising:

camping, by a terminal device, on a first cell, wherein the first cell corresponds to a first frequency;

based on the terminal device detecting that a second cell satisfies a cell reselection condition and reselection to another intra-frequency cell is not allowed for the second cell, skipping, by the terminal device, performing an action of reselection to the second cell, and prohibiting the second cell for a forbidden duration, wherein the second cell is a non-standalone (NSA) cell adjacent to the first cell, and the second cell corresponds to a second frequency, and the second frequency is different from the first frequency; and based on the terminal device detecting that a third cell satisfies the cell reselection condition and a public land mobile network (PLMN) of the third cell and a PLMN of the first cell are equivalent public land mobile networks (EPLMNs), performing, by the terminal device, an action of reselection to the third cell, wherein the third cell is a standalone (SA) cell adjacent to the first cell, and the third cell corresponds to the second frequency.

12. The method according to claim 11, wherein after the camping, by the terminal device, on the first cell, the method further comprises:

performing, by the terminal device, cell measurement on at least one neighboring cell of the first cell;

based on a measurement result of the second cell satisfying the cell reselection condition, determining, by the terminal device, whether the second cell is an NSA cell; and based on the second cell being an NSA cell, determining, by the terminal device, that reselection to another intra-frequency cell is not allowed for the second cell.

13. The method according to claim 12, wherein the determining, by the terminal device, whether the second cell is an NSA cell comprises:

obtaining, by the terminal device, a system information block (SIB) message of the second cell; and based on no tracking area code (TAC) corresponding to a PLMN of the second cell is configured in the SIB message of the second cell, determining, by the terminal device, that the second cell is an NSA cell; otherwise, determining, by the terminal device, that the second cell is an SA cell.

14. The method according to claim 12, wherein the determining, by the terminal device, that the reselection to another intra-frequency cell is not allowed for the second cell comprises:

obtaining, by the terminal device, a master information block (MIB) message of the second cell; and based on an option of reselection to another intra-frequency cell is not allowed is configured in the MIB message of the second cell, determining, by the terminal device, that reselection to another intra-frequency cell is not allowed for the second cell.

15. The method according to claim 11, wherein after the prohibiting the second cell for the forbidden duration, the method further comprises:

based on the terminal device detecting that the third cell satisfies the cell selection condition and the PLMN of the third cell and the PLMN of the first cell are EPLMNs, performing, by the terminal device, an action of selection to the third cell.

16. The method according to claim 11, wherein based on the terminal device detecting that the second cell satisfies the cell reselection condition and reselection to another intra-frequency cell is not allowed for the second cell, the method further comprises:

obtaining, by the terminal device, at least one parameter, wherein the at least one parameter comprises a moving speed of the terminal device, a screen status of the terminal device, a power level of the terminal device, or a signal quality of the first cell;

wherein the prohibiting the second cell for the forbidden duration comprises:

based on the signal quality of the first cell being less than a preset signal quality threshold, prohibiting the second cell for the forbidden duration; and/or based on the moving speed of the terminal device being greater than a preset speed threshold, prohibiting the second cell for the forbidden duration; and/or based on the screen status of the terminal device being a screen-on state, prohibiting the second cell for the forbidden duration; and/or based on the power level of the terminal device being greater than a preset power level threshold, prohibiting the second cell for the forbidden duration.

17. The method according to claim 11, wherein the prohibiting the second cell for the forbidden duration comprises:

adding, by terminal device, the second cell to a barred list and starting a timer with a duration of 300 seconds.

18. A terminal device, comprising:

one or more processors; and a memory, wherein one or more computer programs are stored in the memory, and when the terminal device is running, the one or more processors execute the one or more computer programs stored in the memory, so that the terminal device executes the cell reselection method according to claim 1.

19. A non-transitory computer readable storage medium comprising computer instructions, wherein when the computer instructions are run on a terminal device, the terminal device is enabled to perform the cell reselection method according to claim 1.

20. A chip system, comprising:

at least one processor; and at least one interface circuit configured to read an instruction stored in a memory and send the instruction to the at least one processor, wherein when the instruction is executed by the at least one processor, a terminal device is enabled to perform the cell reselection method according to claim 1.

* * * * *